(12) United States Patent
Youngs et al.

(10) Patent No.: US 8,741,466 B2
(45) Date of Patent: Jun. 3, 2014

(54) CONDUCTION AND CONVECTION COOLED ENERGY STORAGE SYSTEM

(71) Applicant: Allison Transmission, Inc., Indianapolis, IN (US)

(72) Inventors: Daniel J. Youngs, Pittsboro, IN (US); Kurt Biehl, Lebanon, IN (US); Edward Bass, Chambersburg, PA (US); Eric D. Schneider, Carmel, IN (US); Felice E. Bailey, Indianapolis, IN (US); Steven T. Reyburn, Kokomo, IN (US); Dean M. Ford, Noblesville, IN (US); Richard Bletsis, Kokomo, IN (US); Markus Naegeli, Kokomo, IN (US); Jerry Wendling, Anderson, IN (US)

(73) Assignee: Allison Transmission, Inc., Indianapolis, IN (US)

(\*) Notice: Subject to any disclaimer, the term of this patent is extended or adjusted under 35 U.S.C. 154(b) by 0 days.

(21) Appl. No.: 13/721,705

(22) Filed: Dec. 20, 2012

(65) Prior Publication Data

US 2013/0105129 A1 May 2, 2013

Related U.S. Application Data

(60) Division of application No. 13/490,125, filed on Jun. 6, 2012, which is a continuation of application No. PCT/US2011/063695, filed on Dec. 7, 2011.

(60) Provisional application No. 61/420,389, filed on Dec. 7, 2010.

(51) Int. Cl.
*H01M 10/50* (2006.01)
*F28F 7/00* (2006.01)

(52) U.S. Cl.
USPC ........................................... 429/120; 165/80.3

(58) Field of Classification Search
None
See application file for complete search history.

(56) References Cited

U.S. PATENT DOCUMENTS

| 5,170,336 A | 12/1992 | Getter et al. |
| 5,378,555 A | 1/1995 | Waters et al. |
| 5,534,364 A | 7/1996 | Watanabe et al. |

(Continued)

FOREIGN PATENT DOCUMENTS

WO   WO 2006/041034   4/2006

OTHER PUBLICATIONS

Office Action dated May 28, 2013 received in related U.S. Appl. No. 13/490,125.

*Primary Examiner* — Jonathan Crepeau
(74) *Attorney, Agent, or Firm* — Woodard, Emhardt, Moriarty, McNett & Henry LLP

(57) ABSTRACT

An energy storage system comprising at least one energy storage module adapted to supply electrical energy to a hybrid vehicle. The energy storage module comprises an enclosure having at least one battery array located within the enclosure. The energy storage module includes a thermal pad disposed between the battery array and an interior surface of the primary enclosure. A heat sink is disposed on an exterior surface of the primary enclosure. The heat sink comprises a plurality of fins which may be disposed angularly with respect to a longitudinal axis of the primary enclosure. The height or length of the fins may be varied relative to a fan location to provide uniform cooling across the battery cells in the battery array. An enclosing plate is mounted exterior to the heat sink and defining an airflow cavity, wherein the enclosing plate directs air from the fan across the heat sink.

20 Claims, 44 Drawing Sheets

(56) References Cited

U.S. PATENT DOCUMENTS

| | | |
|---|---|---|
| 5,554,455 A | 9/1996 | Inoue et al. |
| 5,882,213 A | 3/1999 | Witek et al. |
| 5,953,207 A | 9/1999 | Aakalu et al. |
| 6,094,927 A | 8/2000 | Anazawa et al. |
| 6,188,574 B1 | 2/2001 | Anazawa |
| 6,368,743 B1 | 4/2002 | Guerin et al. |
| 6,573,616 B2 | 6/2003 | Yamane |
| 6,648,062 B2 | 11/2003 | Fukazu et al. |
| 6,662,891 B2 | 12/2003 | Misu et al. |
| 6,937,473 B2 * | 8/2005 | Cheng et al. .................. 361/704 |
| 6,946,216 B2 | 9/2005 | Mu-Tsai et al. |
| 6,975,515 B2 | 12/2005 | Ng et al. |
| 7,144,647 B2 | 12/2006 | Sugita et al. |
| 7,217,473 B2 | 5/2007 | Ovshinsky et al. |
| 7,369,413 B2 | 5/2008 | Caines et al. |
| 7,401,669 B2 | 7/2008 | Fujii et al. |
| 7,531,270 B2 | 5/2009 | Buck et al. |
| 7,561,429 B2 | 7/2009 | Yahata et al. |
| 7,631,711 B2 | 12/2009 | Kubo |
| 7,642,003 B2 | 1/2010 | Ahn et al. |
| 7,652,880 B2 | 1/2010 | Wayman |
| 7,666,543 B2 | 2/2010 | Higashino |
| 7,745,044 B2 | 6/2010 | Chen et al. |
| 7,764,496 B2 | 7/2010 | Nguyen et al. |
| 7,813,128 B2 | 10/2010 | Marchand |
| 7,819,172 B2 | 10/2010 | Otsuka et al. |
| 7,914,924 B2 | 3/2011 | Sugeno et al. |
| 7,919,203 B2 | 4/2011 | Shibuya et al. |
| 8,081,465 B2 * | 12/2011 | Nishiura ....................... 361/703 |
| 2004/0185339 A1 | 9/2004 | Jones |
| 2004/0233634 A1 | 11/2004 | LaCroix et al. |
| 2006/0115721 A1 * | 6/2006 | Lee et al. ..................... 429/156 |
| 2006/0216582 A1 | 9/2006 | Lee et al. |
| 2007/0102213 A1 | 5/2007 | Seo et al. |
| 2007/0134550 A1 | 6/2007 | Asahina et al. |
| 2007/0139006 A1 | 6/2007 | Yasuhito et al. |
| 2007/0141455 A1 | 6/2007 | Marukawa et al. |
| 2007/0284167 A1 | 12/2007 | Watanabe et al. |
| 2008/0023189 A1 * | 1/2008 | Kimura et al. ................ 165/185 |
| 2008/0050645 A1 | 2/2008 | Kai et al. |
| 2008/0160395 A1 | 7/2008 | Okada et al. |
| 2008/0199764 A1 | 8/2008 | Holman et al. |
| 2008/0299452 A1 | 12/2008 | Nakazawa |
| 2009/0053585 A1 | 2/2009 | Nakazawa |
| 2009/0087722 A1 | 4/2009 | Sakabe et al. |
| 2009/0111010 A1 | 4/2009 | Okada et al. |
| 2009/0142650 A1 | 6/2009 | Okada et al. |
| 2009/0142653 A1 | 6/2009 | Okada et al. |
| 2009/0169978 A1 | 7/2009 | Smith et al. |
| 2009/0173559 A1 | 7/2009 | Nakamura |
| 2009/0180251 A1 | 7/2009 | Biagini et al. |
| 2009/0191453 A1 | 7/2009 | Fujii et al. |
| 2009/0236161 A1 | 9/2009 | Meier et al. |
| 2009/0239130 A1 | 9/2009 | Culver et al. |
| 2009/0253029 A1 | 10/2009 | Inoue |
| 2009/0260905 A1 | 10/2009 | Shinmura |
| 2009/0297892 A1 | 12/2009 | Ijaz et al. |
| 2010/0075206 A1 * | 3/2010 | Tamura .......................... 429/62 |
| 2010/0099015 A1 * | 4/2010 | Kawai ............................ 429/62 |
| 2010/0104927 A1 | 4/2010 | Albright |
| 2010/0116570 A1 | 5/2010 | Sugawara et al. |
| 2010/0136402 A1 | 6/2010 | Hermann et al. |
| 2010/0273034 A1 | 10/2010 | Hermann et al. |
| 2010/0285344 A1 | 11/2010 | Plummer |
| 2011/0005728 A1 * | 1/2011 | Hong et al. ............. 165/104.26 |
| 2011/0008659 A1 | 1/2011 | Okada et al. |
| 2011/0020676 A1 | 1/2011 | Kurosawa |
| 2011/0026226 A1 | 2/2011 | Zheng et al. |
| 2011/0068737 A1 | 3/2011 | Rai et al. |
| 2011/0104547 A1 | 5/2011 | Saito et al. |
| 2012/0231315 A1 | 9/2012 | Yoon |

* cited by examiner

CONDUCTION AND CONVECTION COOLED ENERGY STORAGE SYSTEM

CROSS REFERENCE TO RELATED APPLICATIONS

This application is a divisional of U.S. patent application Ser. No. 13/490,125 filed Jun. 6, 2012. U.S. patent application Ser. No. 13/490,125 is a continuation of International Application No. PCT/US2011/063695 filed Dec. 7, 2011, which claims the benefit of U.S. Provisional Patent Application No. 61/420,389 filed Dec. 7, 2010, the entire disclosures of which are hereby incorporated by reference.

BACKGROUND

The present invention generally relates to an energy storage system and, more particularly, to an energy storage module to be incorporated into a hybrid electric motor vehicle to store high voltage energy.

Over the past few years, there has been a growing concern over global climate change due to an increase in carbon dioxide levels as well as oil supply shortages. As a result, some automobile manufactures and consumers are beginning to have a greater interest in motor vehicles having low emissions and greater fuel efficiency. One viable option is a hybrid electric vehicle (HEV) which allows the vehicle to be driven by an electric motor, combustion engine, or a combination of the two.

Though various features are important to the overall HEV design, the system which stores the energy available for use by the vehicle is a key component. The energy storage system is provided within the HEV to store the energy created by a generator in order for that energy to be available for use by the hybrid system at some later time. For example, the stored energy may be used to drive an electric motor to independently propel the motor vehicle or assist the combustion engine, thereby reducing gasoline consumption.

However, energy storage systems face a variety of design complications, such as over-heating, weight, complexity, ease of incorporation into the vehicle, ease of service, and cost, just to name a few. Additionally, known energy storage systems utilize only a specific and known number of battery packs or modules designed to meet a particular HEV design specification. For example, a battery pack may be specifically designed to provide a specific amount of energy for a 300V vehicle. However, when a different amount of energy is required, such as a 600V system, a different battery pack must be designed to meet the needs of that application. Known battery packs and storage systems can not be utilized or otherwise implemented into different settings without a considerable amount of re-engineering and re-working.

Some known systems allow for separate battery packs to be electrically connected to a separate and distinct control box. Though the independent battery packs may be added to or removed from the overall system, the separate control box is still required. However, because available space for HEV components is at a premium, the inclusion of a separate and distinct control box should be avoided. Additionally, in the event the separate control box fails, the entire energy storage system is unable to function.

Thus, there is a need for improvement in this field.

SUMMARY

The energy storage system described herein addresses several of the issues mentioned above as well as others. For example, an energy storage system according to one embodiment of the present disclosure has a plurality of energy storage modules. The energy storage modules include, among other things, a plurality secondary battery arrays adapted to store high voltage energy. An energy storage controller module is electrically connected to various components within an energy storage module, such as, but not limited to, the battery arrays, a low voltage harness, a thermistor harness, and/or a vehicle signal connector assembly, to name a few examples.

According to one aspect of the present disclosure, the energy storage modules within the energy storage system are adapted to communicate with one another. In one embodiment, a pack-to-pack CAN bus is provided between each energy storage module. When multiple energy storage modules are used to comprise the energy storage system, one energy storage module functions as a master energy storage module while the others function as slave energy storage modules. The energy storage controller module within the master energy storage module is adapted to receive information from the slave energy storage modules and communicate with a transmission/hybrid control module and the rest of the hybrid system as a single energy storage system.

According to another aspect of the disclosure, the energy storage system comprises at least one energy storage module adapted to supply electrical energy to a hybrid vehicle. The energy storage module comprises a primary enclosure, at least one battery array located within the primary enclosure, and an energy storage controller module located within the primary enclosure and electrically connected to the battery array. The energy storage controller module is further connected to a hybrid control module of the hybrid vehicle by a low voltage connecter. A high voltage junction box is attached to a first end of the primary enclosure and has a plurality of high voltage connection terminals. The high voltage junction box has a first opening which corresponds to a second opening of the primary enclosure such that the primary enclosure and high voltage junction box define a sealed cavity. At least one of the high voltage connection terminals is configured to receive a high voltage conductor connected between the energy storage module and an inverter of the hybrid vehicle. A service disconnect is connected in a current path between the high voltage connection terminals and the at least one battery array.

According to other aspects of the present disclosure, the energy storage system includes a thermal pad disposed between the battery arrays and an interior surface of the primary enclosure. A heat sink is disposed on an exterior surface of the primary enclosure. The heat sink comprises a plurality of fins which may be disposed angularly outward in a symmetrical pattern with respect to a longitudinal axis of the primary enclosure. A fan mounted to an exterior surface of a first end of the primary enclosure is operable to direct air across the fins toward a second end of the primary enclosure. The height or length of the fins may be varied relative to the fan location to provide uniform cooling across the battery cells in the battery array. An enclosing plate is mounted exterior to the heat sink and defining an airflow cavity, wherein the enclosing plate further directs air from the fan across the heat sink.

According to other aspects of the disclosure, the energy storage system includes a plug-in bussed electrical center, wherein at least a portion of the high voltage connections between the battery array and the bussed electrical center are achieved using blade terminals. The primary enclosure may further comprise a pressure relief panel disposed within the primary enclosure and operable to limit internal pressure within the primary enclosure.

According to other aspects of the disclosure, the battery array comprises two parallel side rails and two parallel plates perpendicular to the side rails. The battery array may also include battery retainers between the battery cells. The battery retainers are formed from an insulating material of sufficient thickness to limit thermal transfer between the adjacent battery cells to a level which prevents venting of a first battery cell from causing an adjacent second battery cell to vent. The battery array also includes a voltage sense board having a plurality of bus bars disposed therein. The bus bars connect a positive terminal of a first battery cell to a negative terminal of a second battery cell. The voltage send board has missing final bus bars in designated locations of the voltage sense board to limit the exposed voltage to 50 volts during initial assembly. The final bus bars are installed last in conjunction with safety covers which have overlap portions to cover the installed final bus bars.

According to other aspects of the present disclosure, the controller module optionally includes a memory component. The memory component is adapted to record energy storage module usage and status history, such as achieved power levels and duty cycles, to name a few examples.

Further forms, objects, features, aspects, benefits, advantages, and embodiments of the present invention will become apparent from a detailed description and drawings provided herewith.

DETAILED DESCRIPTION

Figure 1:
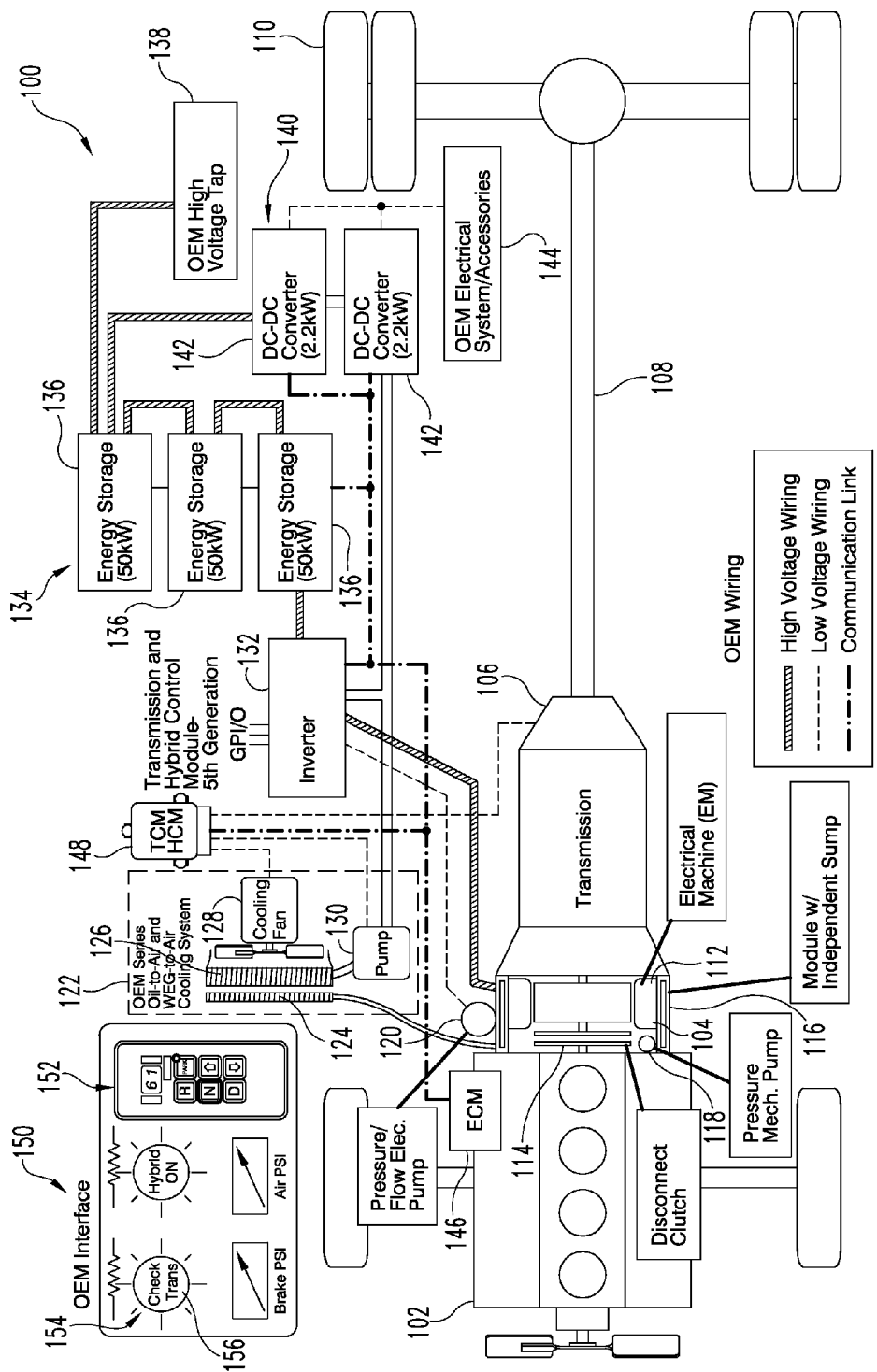
FIG. 1 illustrates a diagrammatic view of one example of a hybrid system.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 from the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant will be used interchangeably herein, these terms are used in a broader sense to include various types of lubricants, such as natural or synthetic oils, as well as lubricants having different properties. To circulate the fluid, the hybrid module 104 includes a mechanical pump 118 and an electrical (or electric) pump 120. With this combination of both the mechanical pump 118 and electrical pump 120, the overall size and, moreover, the overall expense for the pumps is reduced. The electrical pump 120 can supplement mechanical pump 118 to provide extra pumping capacity when required. In addition, it is contemplated that the flow through the electrical pump 120 can be used to detect low fluid conditions for the hybrid module 104. In one example, the electrical pump 120 is manufactured by Magna International Inc. of Aurora, Ontario, Canada (part number 29550817), but it is contemplated that other types of pumps can be used.

The hybrid system 100 further includes a cooling system 122 that is used to cool the fluid supplied to the hybrid module 104 as well as the water-ethylene-glycol (WEG) to various other components of the hybrid system 100 which will be described later in further detail. In one variation, the WEG can also be circulated through an outer jacket of the eMachine 112 in order to cool the eMachine 112. It should be noted that the hybrid system 100 will be described with respect to a WEG coolant, but other types of antifreezes and cooling fluids, such as water, alcohol solutions, etc., can be used. Looking at FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are daisy-chained together to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit requires, then, vehicle and product line modifications and expensive testing to ensure the proper operation and safety of the vehicle, and this expenses tends to lessen or slow adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Figure 2:
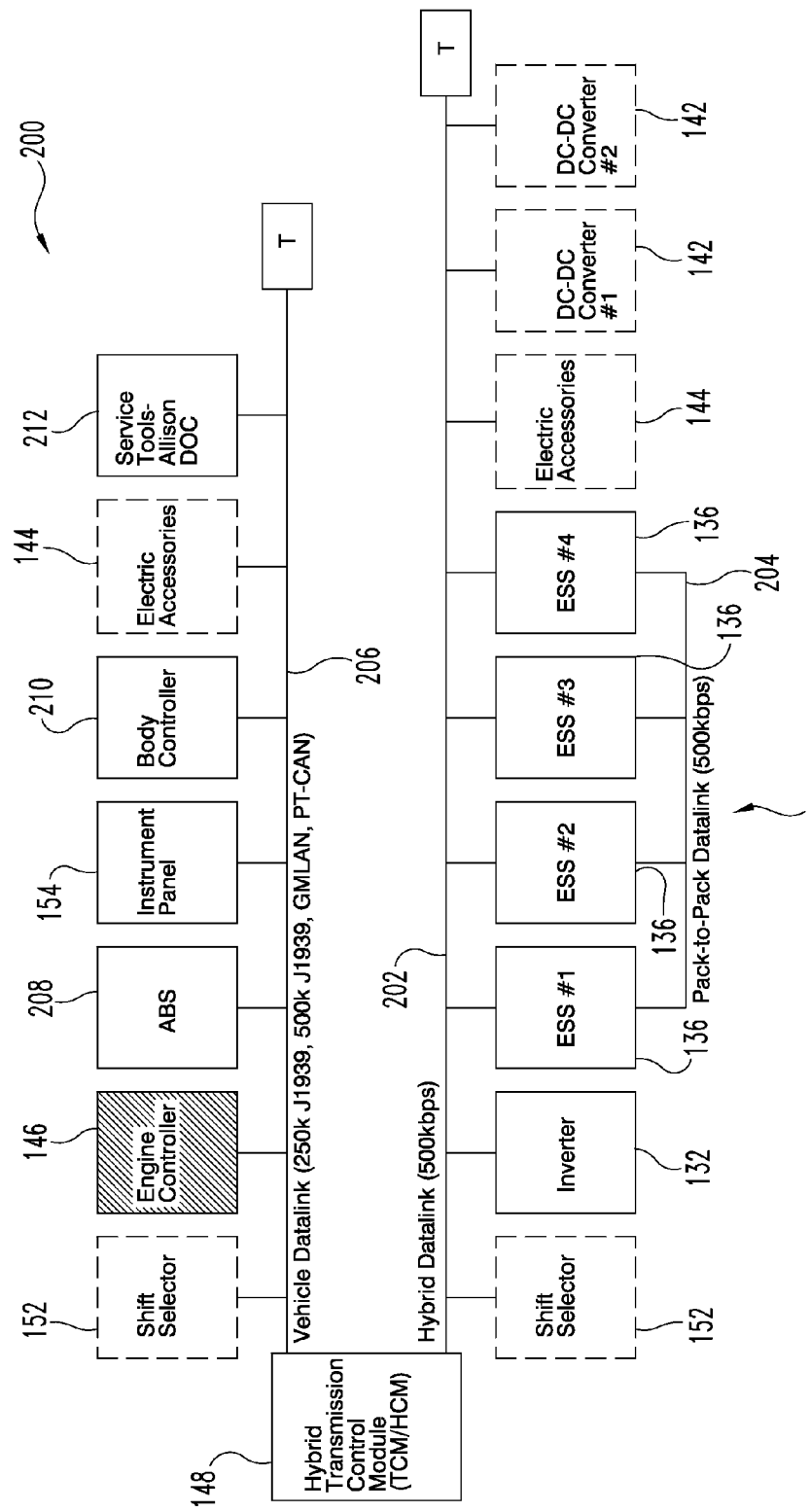
FIG. 2 illustrates a general diagram of an electrical communication system in the FIG. 1 hybrid system.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the shift selector 152, inverter 132, the energy storage system 134, the low voltage systems/accessories 144, and the DC-DC converter modules 142. Within the energy storage system 134, an energy storage module data link 204 facilitates communication between the various energy storage modules 136. However, it is contemplated that in other embodiments the various energy storage system modules 136 can communicate with one another over the hybrid data link 202. With the hybrid data link 202 and the energy storage module data link 204 being separate from the data links used in the rest of the vehicle, the control/electrical component of the hybrid system 100 can be readily tied into the vehicle with minimum impact. In the illustrated example, the hybrid data link 202 and the energy storage module data link 204 each have a 500 kilobit/second (kbps) transmission rate, but it is envisioned that data can be transferred at other rates in other examples. Other components of the vehicle communicate with the transmission/hybrid control module 148 via a vehicle data link 206. In particular, the shift selector 152, the engine control module 146, the instrument panel 154, an antilock braking system 208, a body controller 210, the low voltage systems/accessories 144, and service tools 212 are connected to the vehicle data link 206. For instance, the vehicle data link 206 can be a 250 k J1939-type data link, a 500 k J1939-type data link, a General Motors LAN, or a PT-CAN type data link, just to name a few examples. All of these types of data links can take any number of forms such as metallic wiring, optical fibers, radio frequency, and/or a combination thereof, just to name a few examples.

In terms of general functionality, the transmission/hybrid control module 148 receives power limits, capacity available current, voltage, temperature, state of charge, status, and fan speed information from the energy storage system 134 and the various energy storage modules 136 within. The transmission/hybrid control module 148 in turn sends commands for connecting the various energy storage modules 136 so as to supply voltage to and from the inverter 132. The transmission/hybrid control module 148 also receives information about the operation of the electrical pump 120 as well as issues commands to the auxiliary electrical pump 120. From the inverter 132, the transmission/hybrid control module 148 receives a number of inputs such as the motor/generator torque that is available, the torque limits, the inverter's voltage current and actual torque speed. Based on that information, the transmission/hybrid control module 148 controls the torque speed and the pump 130 of the cooling system. From the inverter 132, it also receives a high voltage bus power and consumption information. The transmission/hybrid control module 148 also monitors the input voltage and current as well as the output voltage and current along with the operating status of the individual DC-DC converter modules 142 of the DC-DC converter system 140. The transmission/hybrid control module 148 also communicates with and receives information from the engine control module 146 and in response controls the torque and speed of the engine 102 via the engine control module 146.

Figure 3:
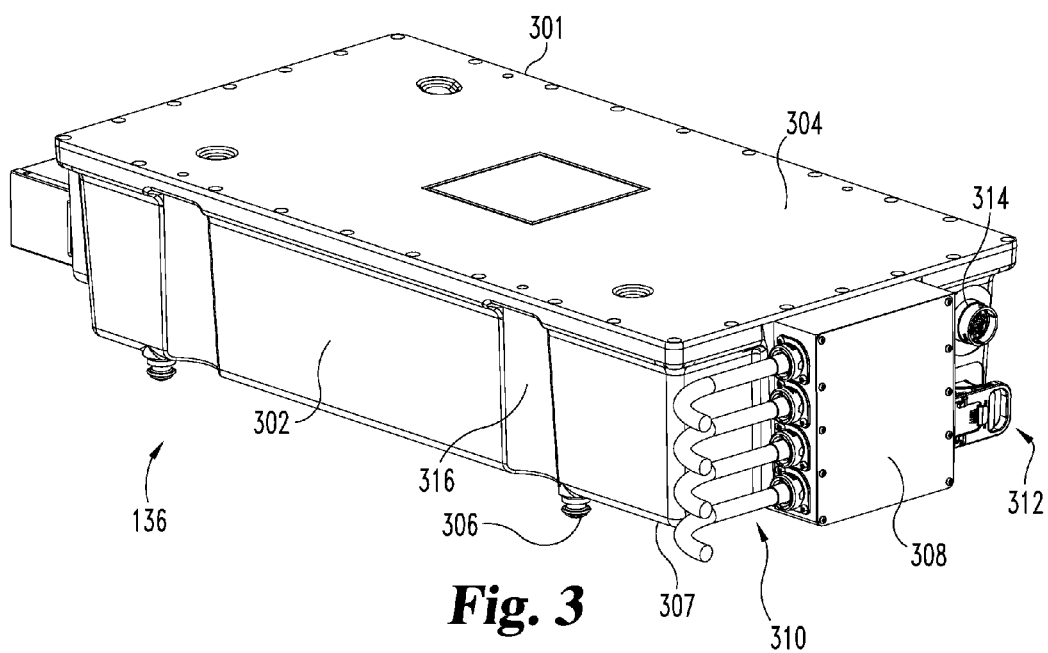
FIG. 3 is a front perspective view of an energy storage module according to one embodiment of the present disclosure.

Turning to FIG. 3, certain embodiments of the energy storage module 136 will now be discussed. As depicted, energy storage module 136 comprises a primary enclosure 301 having a lower housing 302 and an upper cover 304. The lower housing 302 and upper cover 304 are constructed and arranged to withstand large vibrations and high shock loads. In order to provide heavy duty strength for operation in certain environments (i.e., heavy duty trucking) while also being mindful of weight, lower housing 302 and upper cover 304 are constructed of aluminum in one embodiment, though other materials, such as steel, may also be used. According to one embodiment, the energy storage module 136 is constructed to withstand 100G shock loads and 25G vibration loads.

A plurality of mounting feet 306 are located on the bottom of lower housing 302 to assist in the mounting of the energy storage module 136 to the HEV body or frame. Additionally, a plurality of indentations 316 are provided around the periphery of lower housing 302 to also assist in the optional stacking of multiple energy storage modules.

Located at one end 307 of the energy storage module 136 is a high voltage junction box 308. As will be described in more detail below, a series of high voltage cables 310 are connected to the high voltage junction box 308 to deliver high voltage power to and from energy storage module 136. The high voltage junction box 308 may be formed integral to the primary enclosure 301 or as a separate unit.

Also provided on the end 307 of the energy storage module 136 are a service disconnect 312 and a low-voltage vehicle signal connector 314. The service disconnect 312 is provided to break the current path between the high voltage energy sources within the primary enclosure 301 and the electronics within the high voltage junction box 308. The service disconnect 312 ensures user safety during service operations of the energy storage module 136. The vehicle signal connector 314 allows for the energy storage module 136 to be in electrical and communicative connection with other components of the hybrid system, such as, but not limited to, the transmission/hybrid control module 148. In one embodiment, the vehicle signal connector 314 is a forty seven (47) way connector which includes gold terminals. According to one aspect of the present disclosure, the vehicle signal connector 314 is also designed and validated for heavy duty applications. Though the embodiment illustrated in FIG. 3 includes a single vehicle signal connector 314, other embodiments may include two or more signal connectors.

Figure 4:
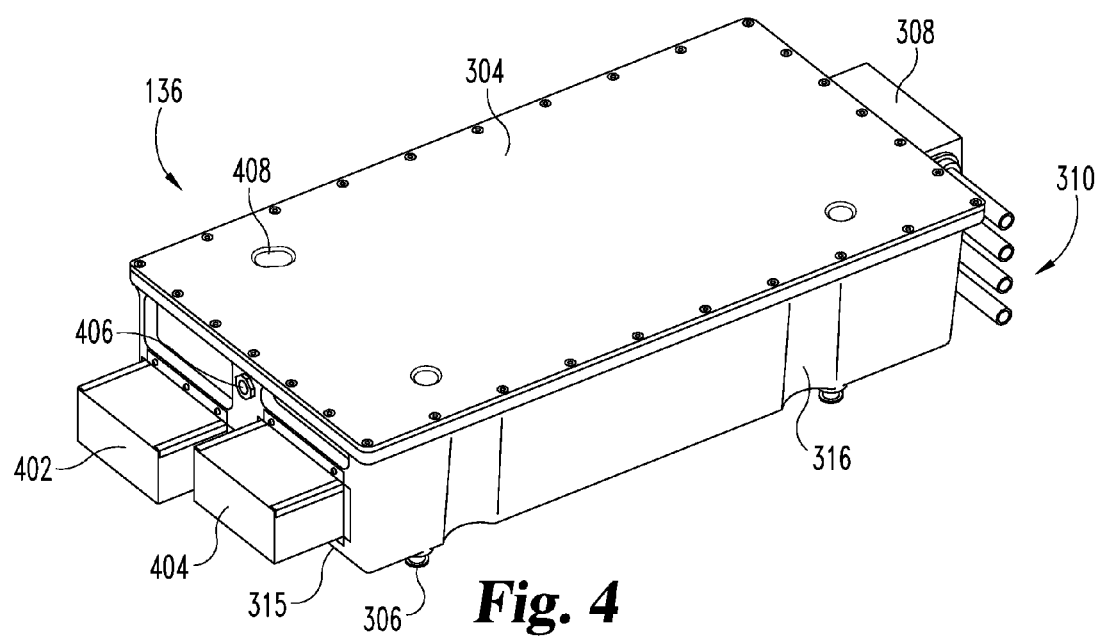
FIG. 4 is a rear perspective view of the energy storage module depicted in FIG. 3.

FIG. 4 depicts a perspective view of the other end 315 of the energy storage module 136. As shown, a plenum inlet cover 402 and a plenum outlet cover 404 are provided at the same end 315 of the energy storage module 136. The covers 402, 404 are constructed and arranged to guide the air entering and exiting the energy storage module 136. In some embodiments, covers 402, 404 may be connected and have a unitary design. An exhaust vent 406 is provided to allow for the safe exhaustion of potentially harmful gases and fumes in the event of a failure of a battery cell, as will be discussed in greater detail below. A plurality of recesses 408 is provided on the upper cover 304 to assist in the optional stacking and mating of multiple energy storage modules.

In some embodiments, the energy storage module 136 has a physical dimension of 1100 mm×470 mm×235 mm, though larger and smaller dimensions may be warranted depending upon a particular HEV design and are within the scope of the present disclosure. In some embodiments, the energy storage module has a weight between 50 and 100 kilograms, though lighter and heavier weights are within the scope of the present disclosure.

Figure 5:
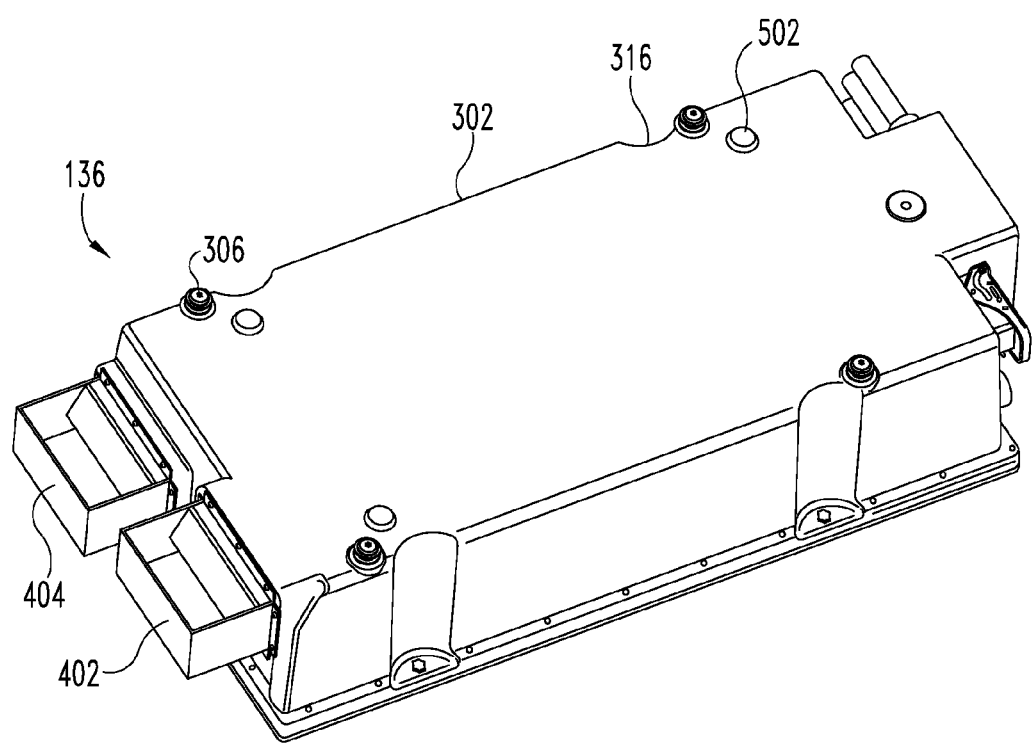
FIG. 5 is a bottom perspective view of the energy storage module depicted in FIG. 3.

FIG. 5 provides a perspective view of the underside of the lower housing 302 of energy storage module 136. As depicted, lower housing 302 includes a plurality of protrusions 502 on its bottom surface. In the illustrated embodiment, recesses 408 correspond to the configuration of the protrusions 502 in order to provide a stable arrangement when an additional energy storage module is stacked on top of the upper cover 304.

Figure 6:
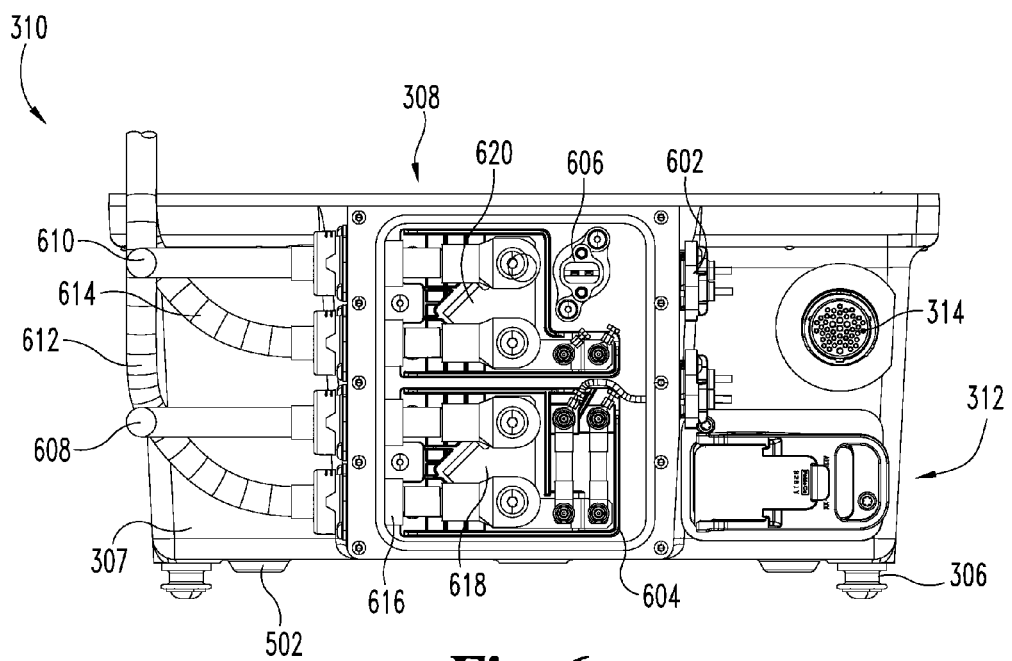
FIG. 6 is an end view of the energy storage module depicted in FIG. 3.

FIG. 6 provides a more detailed view of the end 307 of the energy storage module 136 including the high voltage junction box 308. In the illustrated embodiment, all electrical connections are made available on the same end 307 of the energy storage module 136. The high voltage junction box 308 includes two auxiliary direct current (DC) connections 602 and corresponding auxiliary fuses 604. These components provide additional sources of high voltage DC power to be used by the hybrid system and/or vehicle accessories. In one embodiment, one DC connection 602 allows the energy storage module 136 to be connected to the DC-DC converter system 140. The high voltage junction box 308 also includes a high voltage interlock (HVIL) 606 which safely isolates the high voltage components from the rest of the vehicle when triggered.

As noted above, a series of high voltage cables 310 connect a series of peripheral components to the high voltage junction box 308 via high voltage connectors 616. More specifically, a positive inverter cable 608 provides the positive connection to inverter 132, whereas a negative inverter cable 610 provides the negative connection to inverter 132. A positive mating cable 612 provides the positive connection to an additional, stacked energy storage module or other high voltage device and a negative mating cable 614 provides the negative connection to an additional, stacked energy storage module or other high voltage device. Positive cables 608, 612 are electrically connected to positive terminal 618 and negative cables 610, 614 are electrically connected to negative terminal 620.

In one embodiment, the ends of cables 310 and connectors 616 are keyed in order to prevent connection error. In one arrangement, each cable is provided with an individual key. In another embodiment, the positive cables 608, 612 are keyed the same, while the negative cables 610, 614 are keyed the same but different from positive cables 608, 612.

Figure 7A:
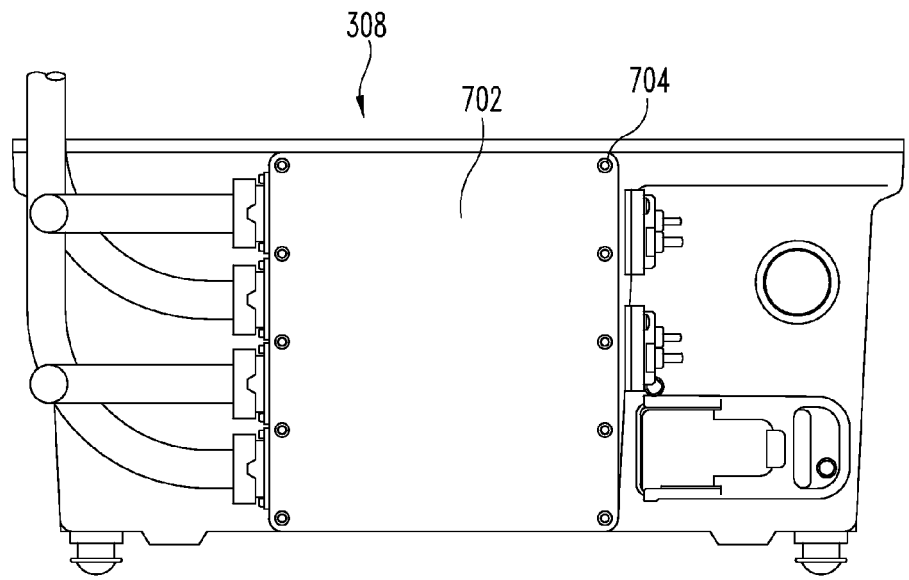
FIG. 7A is an end view of an energy storage module with the access cover attached according to one embodiment of the present disclosure.
Figure 7B:
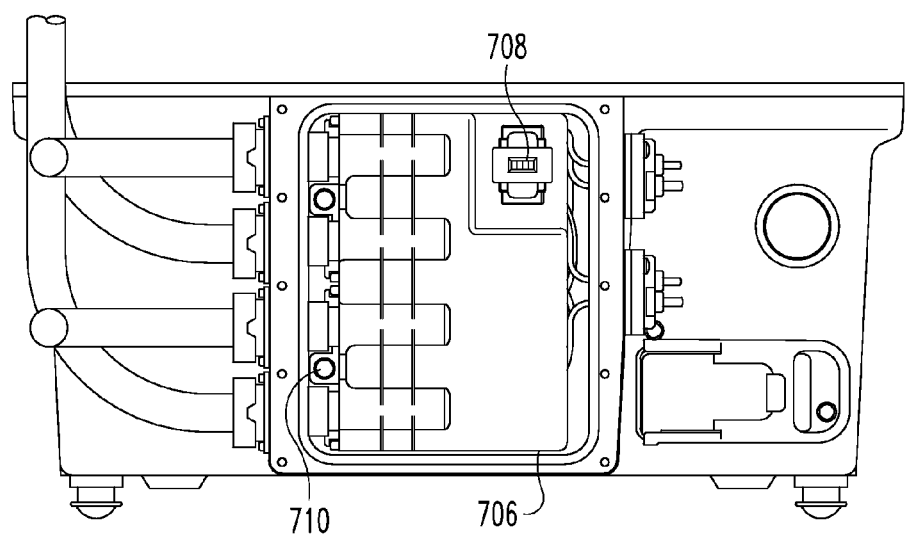
FIG. 7B is an end view of an energy storage module with the access cover removed and the safety cover in place according to one embodiment of the present disclosure.

FIGS. 7A, 7B depict the high voltage junction box 308 safety access features according to one embodiment of the present disclosure. As shown in FIG. 7A, the high voltage junction box 308 is a sealed unit protected by an access cover 702. In order to gain access to inside the junction box 308, fasteners 704 must be removed and the access cover 702 may be lifted away.

FIG. 7B depicts the high voltage junction box 308 with the access cover 702 removed. For precautionary purposes, a safety cover 706 is provided to act as a further barrier to the high voltage terminals behind it. In order to access the electronics depicted in FIG. 5, an HVIL resistor 708 must be removed in order to disconnect the HV power to the positive terminal 618 and the negative terminal 620. Additionally, the fasteners 710 must be taken out before the safety cover 706 can be removed. Once those actions are completed, the electronics within the high voltage junction box 308 as illustrated in FIG. 5 can then be safely accessed.

Figure 8:
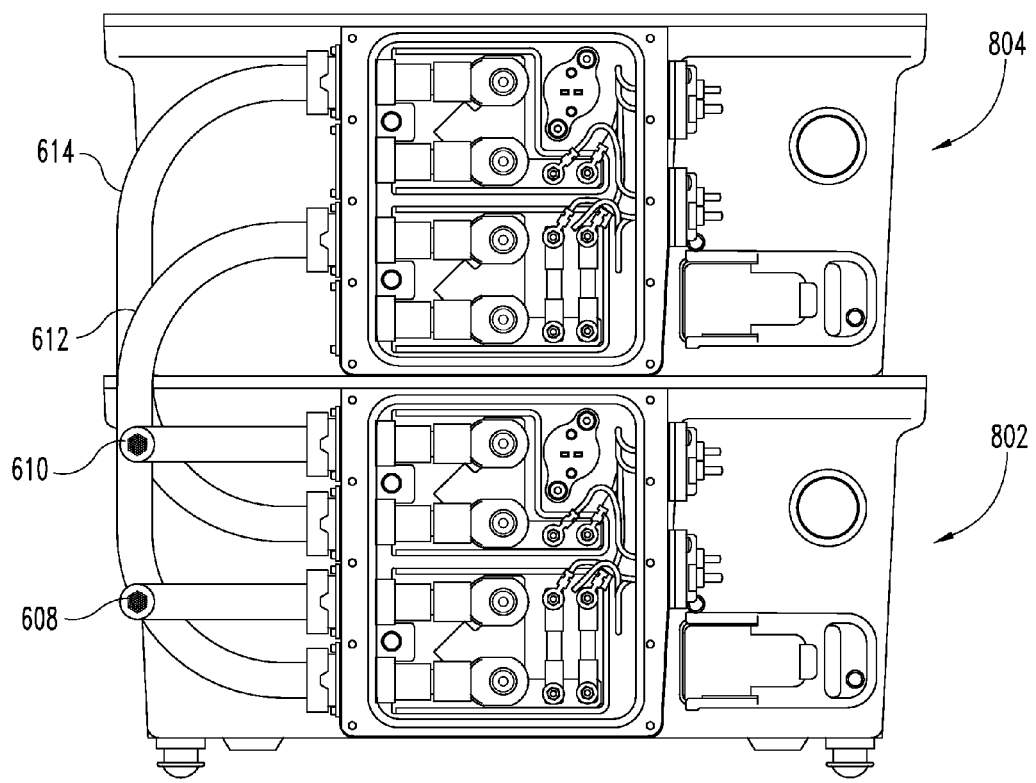
FIG. 8 is an end view of an energy storage module stacking arrangement according to one embodiment of the present disclosure.

FIG. 8 illustrates the HV power connections between stacked energy storage modules. As shown, one energy storage module 802 functions as the master module. Master module 802 is connected to the hybrid system inverter 132 via cables 608, 610. A second energy storage module 804 functions as a slave module. In the illustrated embodiment, slave module 804 is not connected to the inverter 132 but is only connected to the master module 802 via cables 612, 614. Therefore, master module 802 essentially contains two sets of main power connections: one to the hybrid system, one to the slave module 804.

Figure 9:
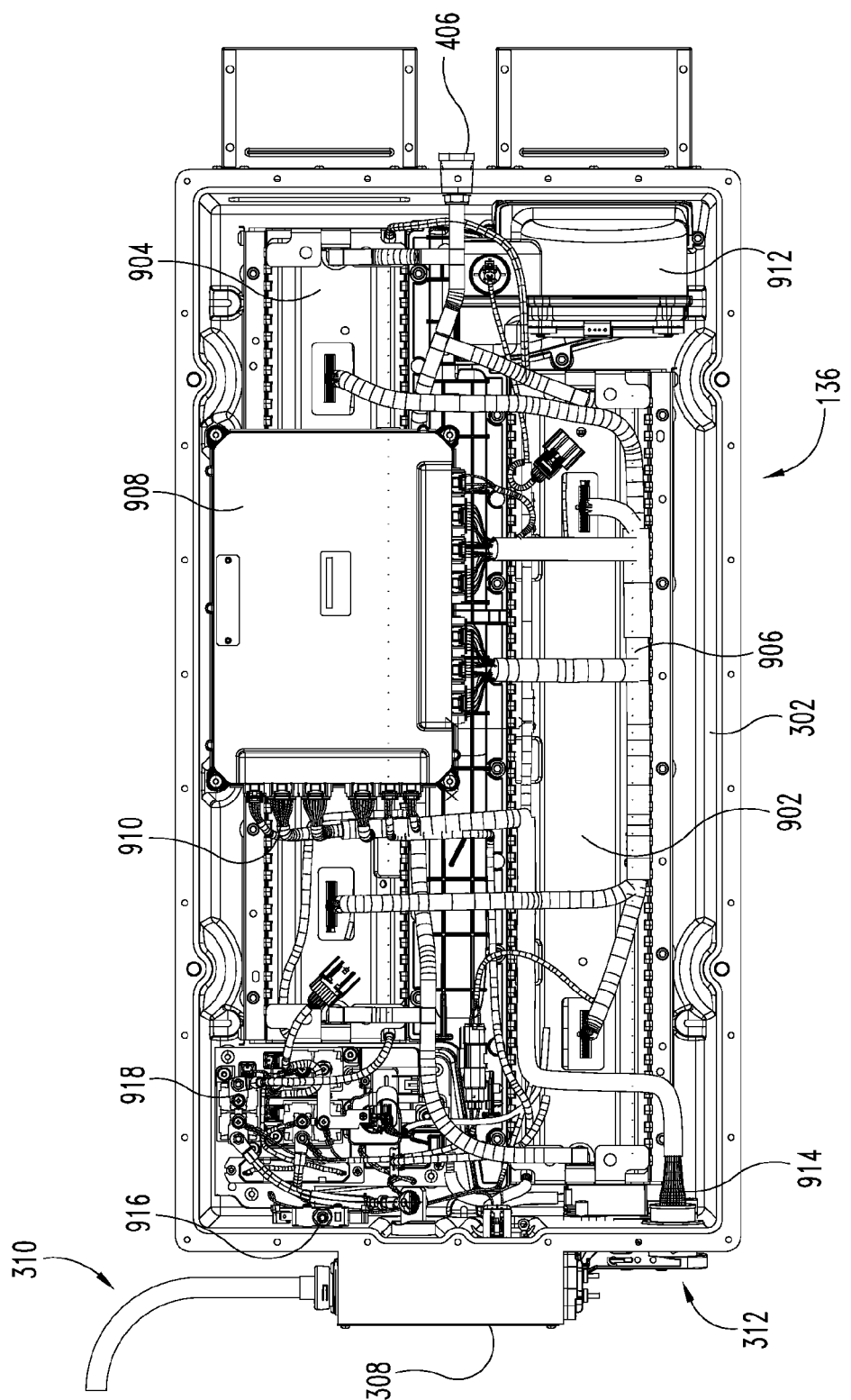
FIG. 9 is a top view of an energy storage module with the top cover removed according to one embodiment of the present disclosure.

FIG. 9 depicts a top view of the energy storage module 136 in which the upper cover 304 has been removed in order to show various components. In the illustrated embodiment, energy storage module 136 includes a first battery array 902 and a second battery array 904. The battery arrays 902, 904 allow for both (a) the high voltage energy received from the inverter 132 to be stored and (b) to provide high voltage energy to the inverter 132 in order to power an appropriate hybrid system component, as well as other system components via auxiliary DC connections 602. Each battery array 902, 904 is connected to a high voltage harness 906 which is electrically connected to a controller module 908. The battery arrays 902, 904 are also electrically connected to a bussed electrical center (BEC) 918, which is constructed and arranged to, among other things, properly distribute the high voltage energy to the high voltage junction box 308 and cables 310.

In addition to the high voltage harness 906, the controller module 908 is also electrically connected to a low voltage harness 910. The low voltage harness 910 provides a communicative connection between the controller 908 and various components within the energy storage module 136, such as, but not limited to, fan assembly 912, vehicle signal connector assembly 914, and BEC 918. A high voltage interlock switch 916 is also provided inside the energy storage module 136 as a further safety precaution. The high voltage interlock switch 916 is in electrical and communicative connection with BEC 918. BEC 918 is adapted to trigger switch 916 and disconnect the high voltage power from the high voltage junction box 308 if the high voltage electrical conditions become unsafe.

In other, non-illustrated embodiments, the various components may be rearranged and relocated, such as, but not limited to, BEC 918 and portions of fan assembly 912. In one embodiment, the fan assembly 912 may be positioned outside of primary enclosure 301. In other embodiments, BEC 918 may be located inside high voltage junction box 308. As appreciated by those of ordinary skill in the art, these modifications and others may be implemented to reduce high voltage exposure under service conditions.

Figure 10:
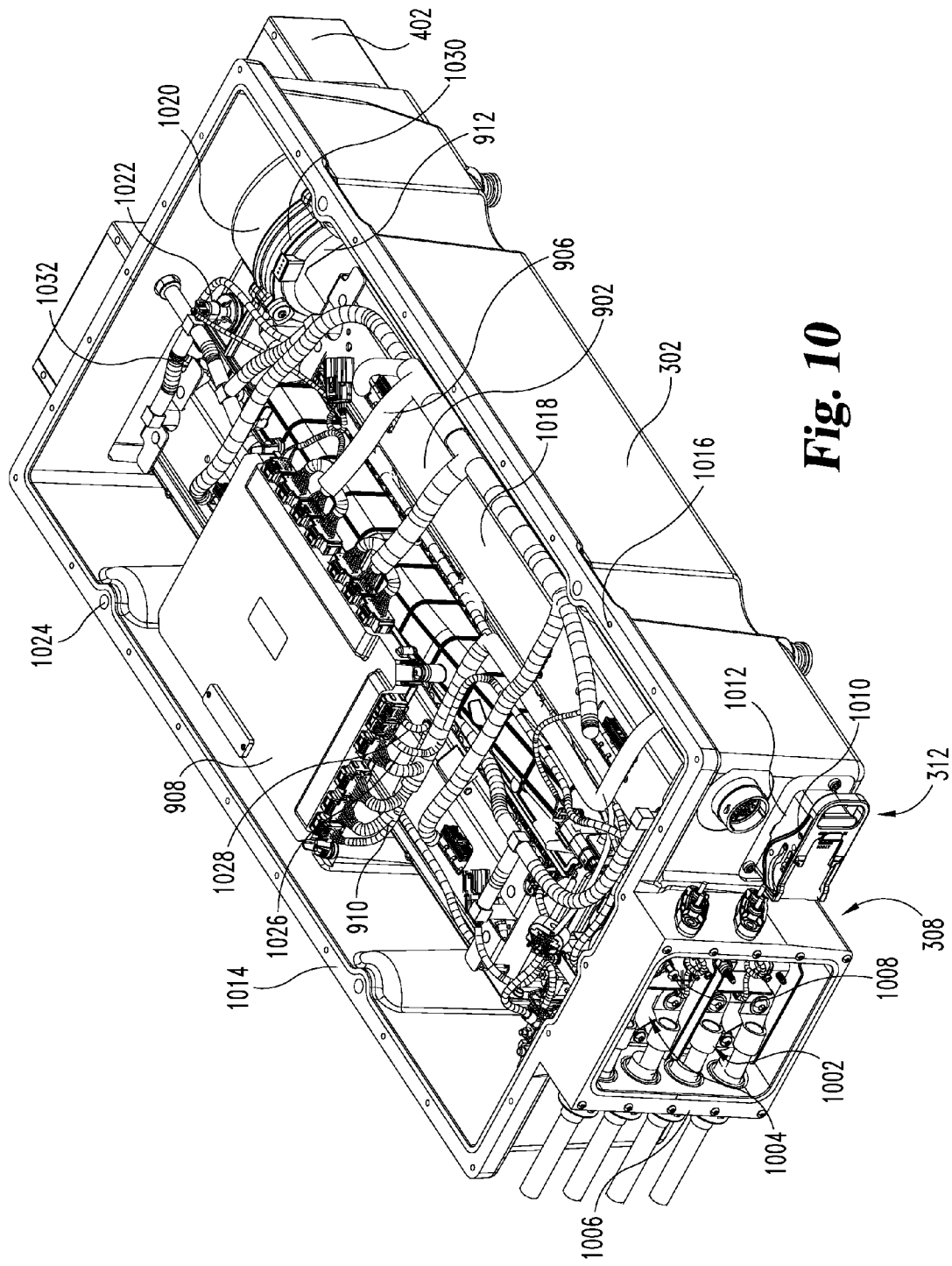
FIG. 10 is a further perspective view the energy storage module of FIG. 9 with the top cover removed according to one embodiment of the present disclosure.
Figure 11:
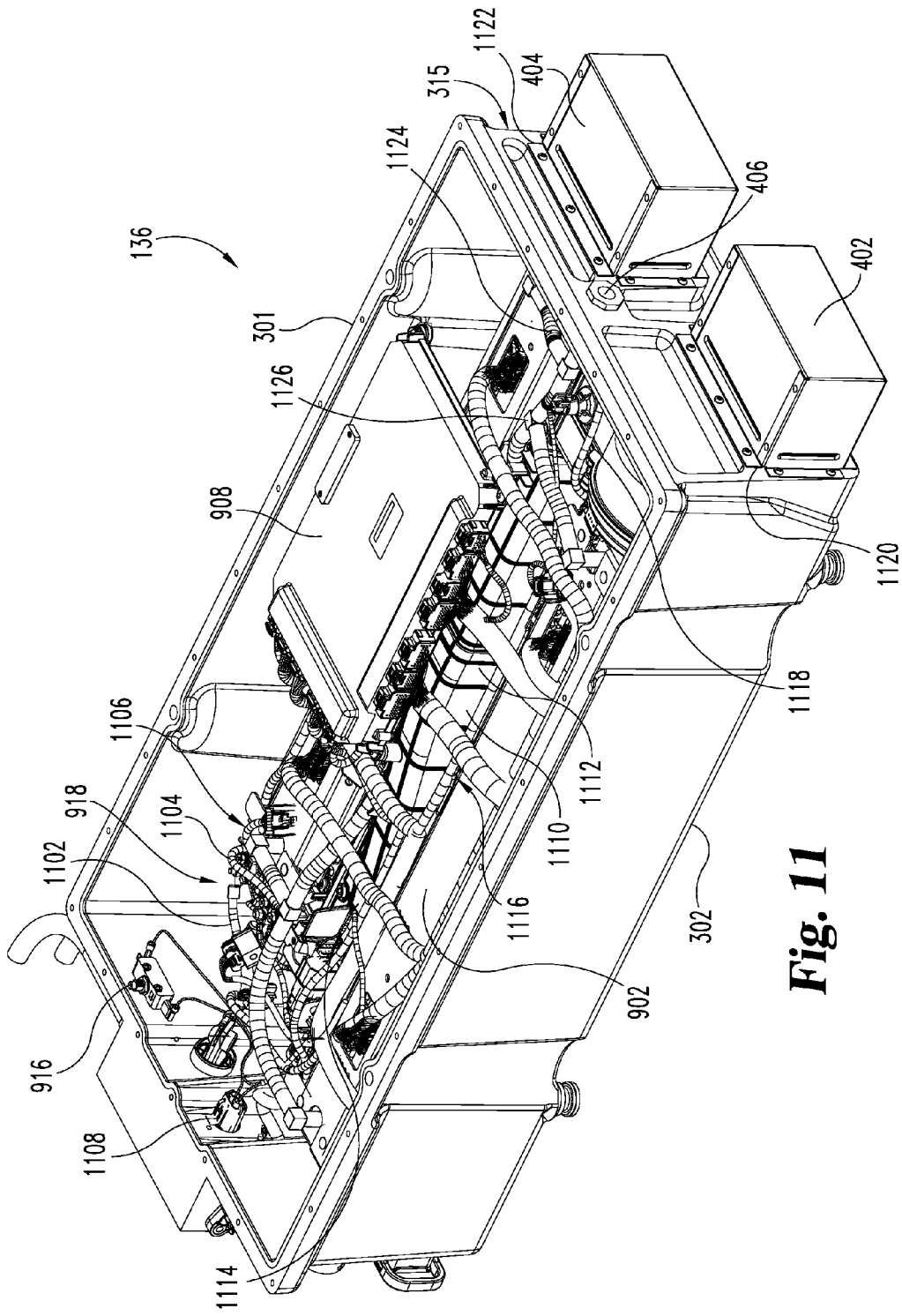
FIG. 11 is a further perspective view of the energy storage module depicted in FIG. 10 with the top cover removed according to one embodiment of the present disclosure.

FIGS. 10 and 11 provide a more detailed overview of the components within the energy storage module 136. As illustrated, the high voltage junction box 308 includes both a positive header assembly 1002 and negative header assembly 1004. Disposed underneath the access cover 702 is access cover seal 1006 which ensures that particles and moisture are kept out of the high voltage junction box 308. Also provided is high voltage interlock conductor 1008. In certain embodiments, the back of the high voltage junction box 308 may be open with respect to the lower housing 302 to allow the various electrical connections between the high voltage junction box 308 and the BEC 918 or controller 908. In other embodiments, the back of the high voltage junction box may be sealed with respect to the lower housing 302, with the wiring connections between the high voltage junction box 308 and the BEC 918 being individually sealed to prevent contaminants from entering the primary enclosure 301 via the high voltage junction box 308.

The service disconnect 312 comprises service disconnect plug 1010 and base 1012. The service disconnect plug 1010 of service disconnect 312 is provided to break the current path between the high voltage energy sources within the energy storage module 136 and the electronics within the high voltage junction box 308.

A seal 1014 is disposed underneath the upper cover 304 to ensure that particles and moisture are kept out of the energy storage module 136. A series of bolts 1016 are utilized to fix the upper cover 304 to the lower housing 302, though other known techniques may be utilized. Around the outer periphery of both the upper cover 304 and the lower housing 302 are a plurality of holes 1024 adapted to facility both the lifting of the energy storage module 136 as well as the stacking of multiple energy storage modules 136.

A safety cover 1018 is positioned on top of the battery array 902. The safety cover 1018 protects the battery cells comprising the battery array 902 from damage and contact with the other components within the energy storage module 136. A battery end plate seal 1032 is provided at each end of the battery arrays 902, 904 to further protect the arrays from contamination and damage.

Positioned between the plenum inlet cover 402 and the fan assembly 912 is a plenum/fan interface 1020. An inlet air sensor 1022 is located downstream of the plenum/fan interface 1020 and is adapted to monitor the air flow into the energy storage module 136. A fan housing seal 1030 is also provided adjacent to the fan assembly 912.

As discussed with respect to FIG. 9, the controller module 908 is electrically and communicatively connected to low voltage harness 910, as well as a thermistor high harness 1026 and a thermistor low harness 1028. As appreciated by those of skill in the art, a thermistor is a resistor whose resistance varies with changes in temperature. Accordingly, the thermistor harnesses 1026, 1028 may communicate temperature data related to the BEC 918, inlet air, outlet air, the battery arrays 902, 904, the fan assembly 912, etc.

Looking now at FIG. 11, BEC 918 includes a positive high voltage conductor 1102 electrically connected to the positive header assembly 1002 and a negative high voltage conductor 1104 electrically connected to the negative header assembly 1004. BEC 918 further includes a negative conductor 1106.

A high voltage interlock header pass through 1108 is provided adjacent to high voltage junction box 308. Referring now also to FIGS. 9 and 10, the HVIL pass through 1108 electrically connects the HVIL conductor 1008 with the HVIL switch 916. Accordingly, when the HVIL resistor 708 is removed from the HVIL 606, the HVIL pass through 1108 indicates an open circuit and the HVIL switch 916 is tripped to disconnect the high voltage power from the electronics within the high voltage junction box 308.

During operation, various components within energy storage module 136 generate a considerable amount of heat, particularly the battery arrays 902, 904. In order for the components to properly function, the heat must be adequately dissipated. Pursuant to the illustrated embodiment, the battery arrays 902, 904 and other components within the energy storage module 136 are air cooled. In order to guide and provide a separate air flow along the battery arrays 902, 904, a plenum cover 1110 is provided between the battery arrays 902, 904. The plenum cover 1110 has a fan end 1112, which is positioned adjacent to the fan assembly 912, and a BEC end 1114, which is located near the BEC 918. In the illustrated embodiment, the fan end 1112 is taller than the BEC end 1114. The tapering of plenum cover 1110 ensures that the air flow through the plenum maintains an adequate velocity as it flows away from the fan assembly 912. A plenum air seal 1116 is disposed beneath the plenum cover 1110.

A mid pack conductor 1118 electrically connects the first battery array 902 with the second battery array 904. The mid pack conductor 1118 allows the controller module 908 to monitor the battery arrays 902, 904 as if they were a single array.

As previously discussed, the plenum inlet cover 402 and the plenum outlet cover 404 are provided at one end 315 of the primary enclosure 301. In order to ensure no debris or moisture is introduced into the energy storage module 136, an inlet cover seal 1120 is provided between the outer periphery of the plenum inlet cover 402 and the lower housing 302. Similarly, an outlet cover seal 1122 is provided between the outer periphery of the plenum outlet cover 404 and the lower housing 302.

In one embodiment, potentially harmful and noxious gases which may vent when under abuse or failure from the battery cells within the battery arrays 902, 904, exhaust vent manifold 1124 is provided along the length of the battery arrays 902, 904. The vent tubes comprising manifold 1124 are connected at a vent tee 1126, with the exhaust gases then being delivered to the exhaust vent 406. Known techniques can then be implemented to treat or otherwise dispose of the exhaust gases.

Figure 12:
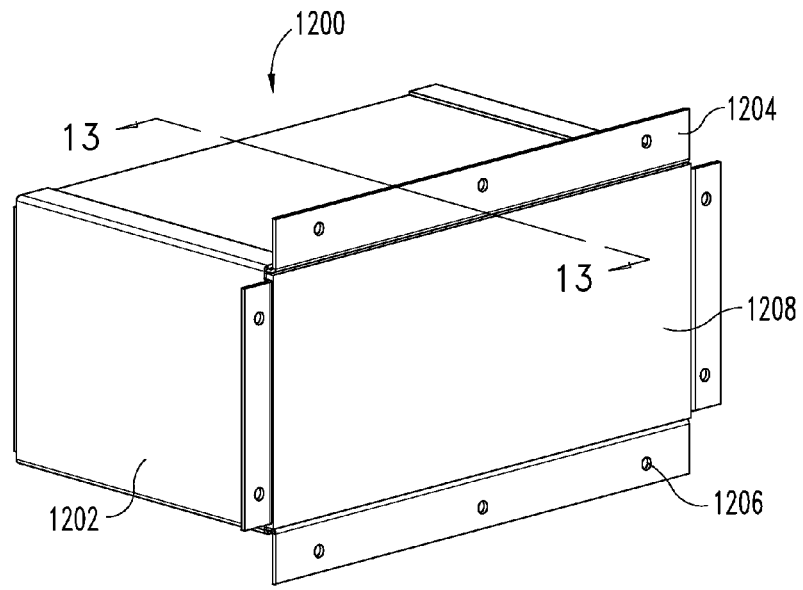
FIG. 12 is a perspective view of a plenum end cap according to one embodiment of the present disclosure.

FIG. 12 provides a perspective view of a plenum end cap 1200. The plenum end cap 1200 may be used as plenum inlet cover 402 and/or plenum outlet cover 404. The end cap 1200 comprises a body 1202 and a plurality of mounting flanges 1204. The mounting flanges 1204 are constructed and arranged to lay flat against and provide a surface to be affixed to the lower housing 302. In the illustrated embodiment, the end cap 1200 is affixed to the lower housing 302 by a plurality of fasteners placed through the holes 1206. In other embodiments, the end cap 1200 may be held to the lower housing 302 through other known techniques, such as, but not limited to, nails, welding, glue, etc. A filter 1208 is provided to limit the amount of debris that enters the air plenum.

Figure 13:
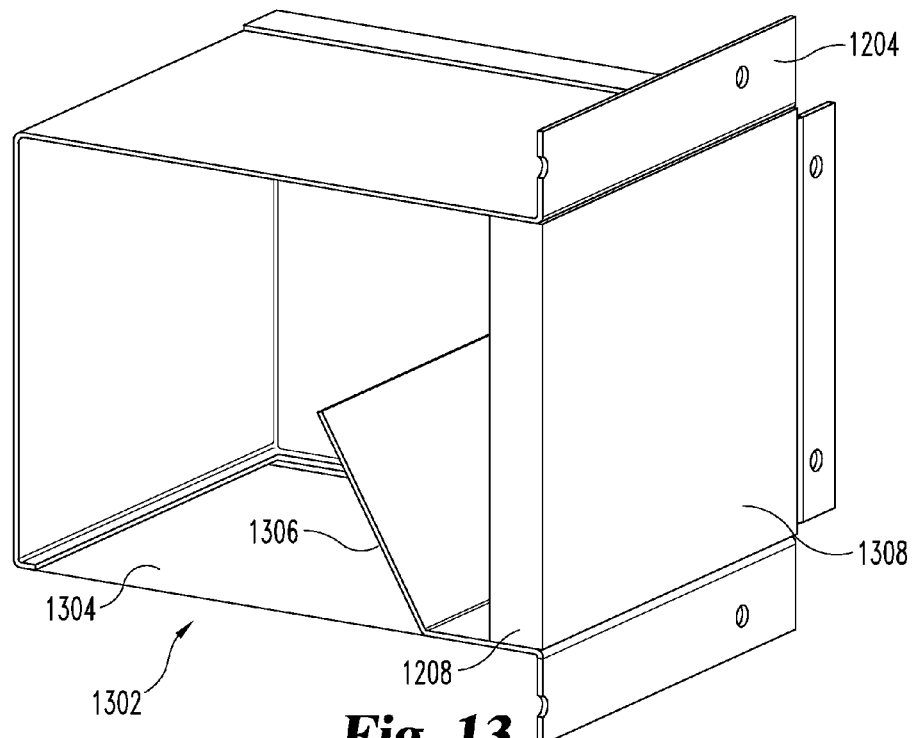
FIG. 13 is a cross-sectional view of the end cap of FIG. 12 taken along line A-A according to one embodiment of the present disclosure.

FIG. 13 is a cross-sectional view of end cap 1200 taken along line 13-13 of FIG. 12. As illustrated, the bottom end of the cap body 1202 is open to provide an external air flow opening 1302, which assists in limiting the amount of debris entering the air plenum. However, in order to further ensure that debris does not enter the air plenum, a particle screen 1304 is optionally provided within the opening 1302. Within end cap 1200 is an air deflector 1306. The area within the mounting flanges 1204 defines an air inlet opening 1308, which is optionally filled with the filter 1208. The air inlet opening 1308 is positioned adjacent to the plenum/fan interface 1020. In one embodiment, the air inlet opening 1308 has a dimension of 100 mm×75 mm, though other dimensions may be appropriate depending on design specifications.

According to one embodiment of the present disclosure, a heating and/or cooling unit is positioned adjacent to plenum/fan interface 1020. In such an embodiment, the controller module 908 works in conjunction with the thermistor harnesses 1026, 1028 to determine if the introduction of hot or cold air into the energy storage system is warranted. In yet other embodiments, the inlet cover 402 and the outlet cover 404 are in fluid connection, which allows the air to be recirculated throughout the energy storage module 136 in cold weather conditions. In further embodiments, the plenum inlet cover 402 and plenum outlet cover 404 are connected to a snorkel-type device. The snorkel device provides a means to keep the energy storage module 136 free of water in the event it becomes submerged. The snorkel device may also be used to transport cool air to the plenum inlet cover 402 of the energy storage module 136.

Figure 14:
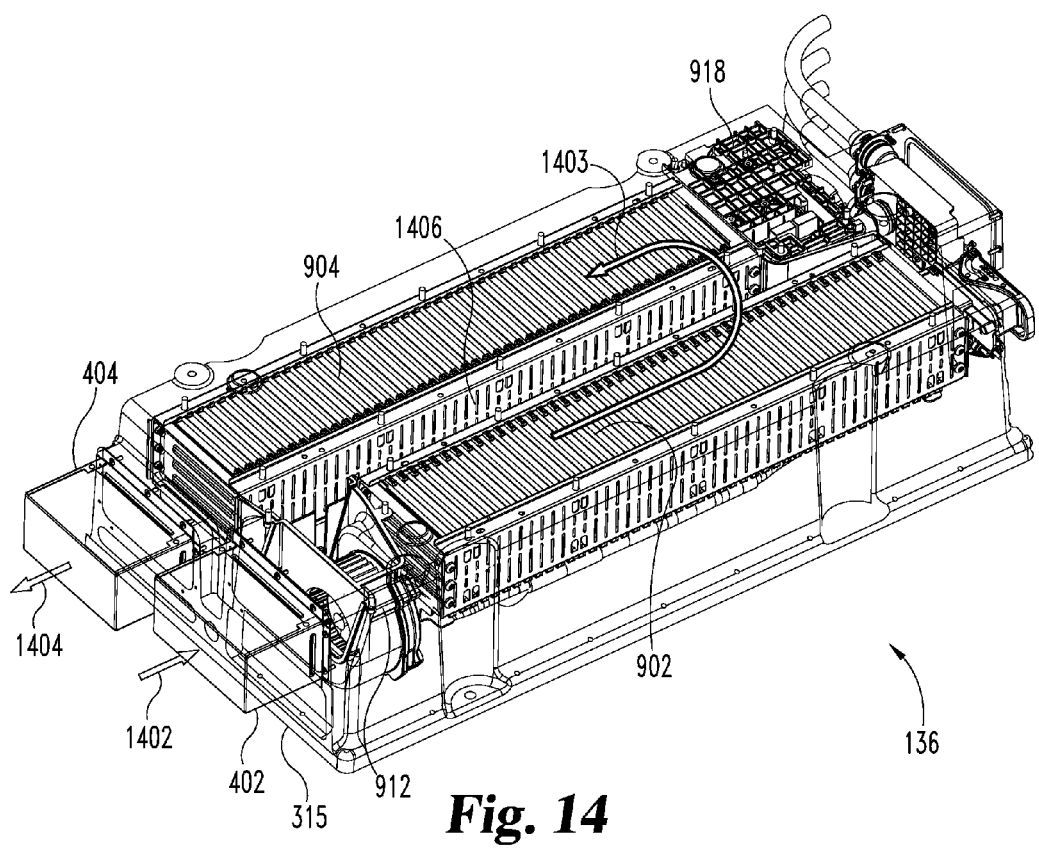
FIG. 14 is a bottom perspective view of an energy storage module depicting the cooling air flow according to one embodiment of the present disclosure.

FIG. 14 generally depicts the cooling air flow through the energy storage module 136. As previously discussed, the plenum inlet cover 402 and the plenum outlet cover 404 are provided on the same end 315 of the energy storage module 136. When fan assembly 912 is powered on, external air is drawn into the energy storage module 136, as indicated by arrow 1402. The air is forced along the battery array 902, around the BEC 918, and back up along the battery array 904. The exhaust air is generally indicated by arrow 1404. The cooling air flow is guided along by the plenum cover 1110 in a U-shape pattern as indicated by arrow 1403. As appreciated by those of skill in the art, the battery arrays 902, 904 generate a considerable amount of heat during operation. If the heat is not dissipated, the arrays may overheat and malfunction. Accordingly, the air flow provided by the present disclosure adequately dissipates that heat.

Figure 15:
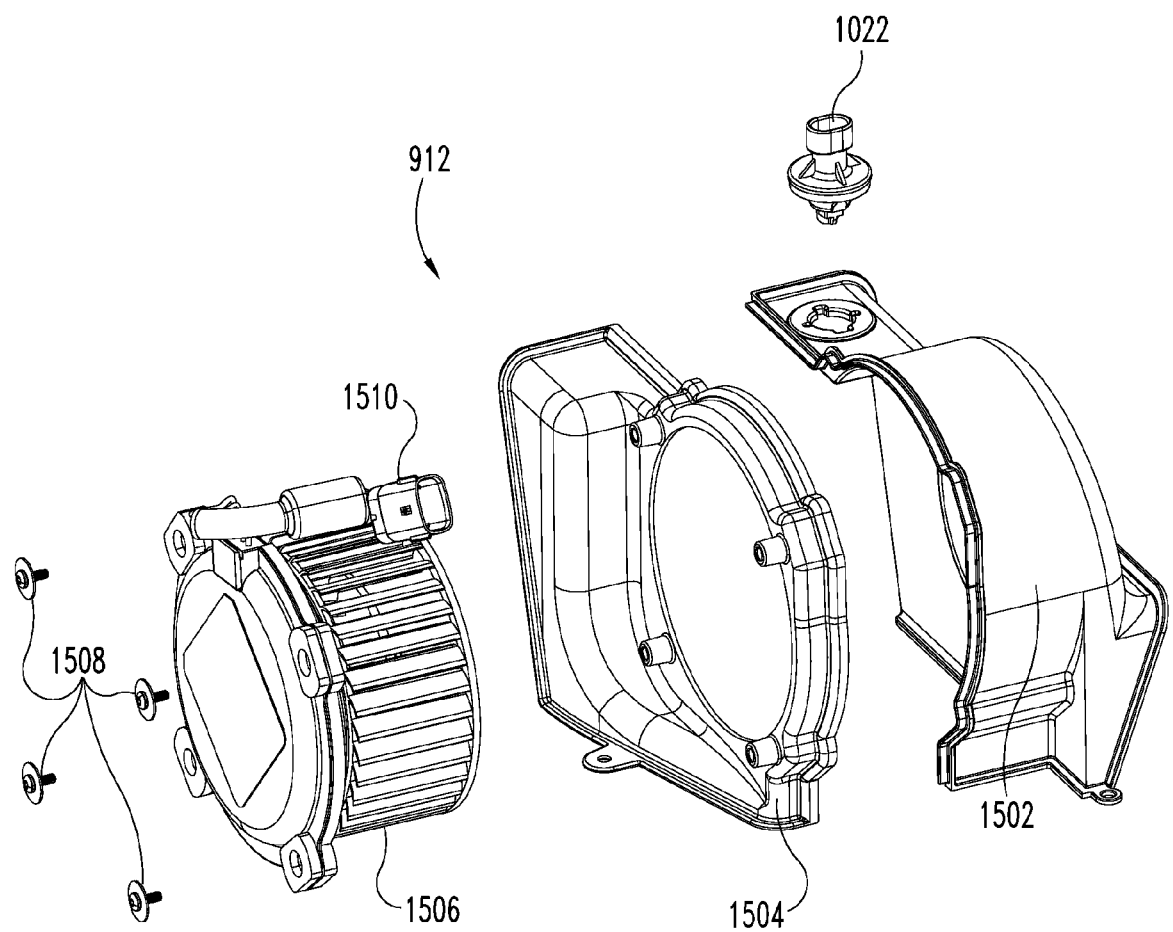
FIG. 15 is an exploded view of a fan assembly according to one embodiment of the present disclosure.

FIG. 15 is an exploded view of the fan assembly 912 according to one embodiment. As illustrated, the fan assembly 912 comprises a first fan housing 1502, inlet air sensor 1022, second fan housing 1504 and brushless fan 1506. The first fan housing 1502 is positioned adjacent to the plenum/fan interface 1020 and mounted directly to the lower housing 302. The inlet air sensor 1022 is constructed and arranged to monitor the inlet air flow coming into the cooling plenum. The information is communicated to the controller module 908.

The first fan housing 1502 is constructed and arranged to receive the second fan housing 1504. The fan 1506 is mounted to the second fan housing 1504 by a plurality of screws 1508. The fan 1506 includes a communication connector 1510 which allows the controller module 908 to monitor and control the operation of the fan 1506. In one embodiment, the fan 1506 is brushless and operates at 12V, although other types of fans and voltage levels may be used.

Figure 16:
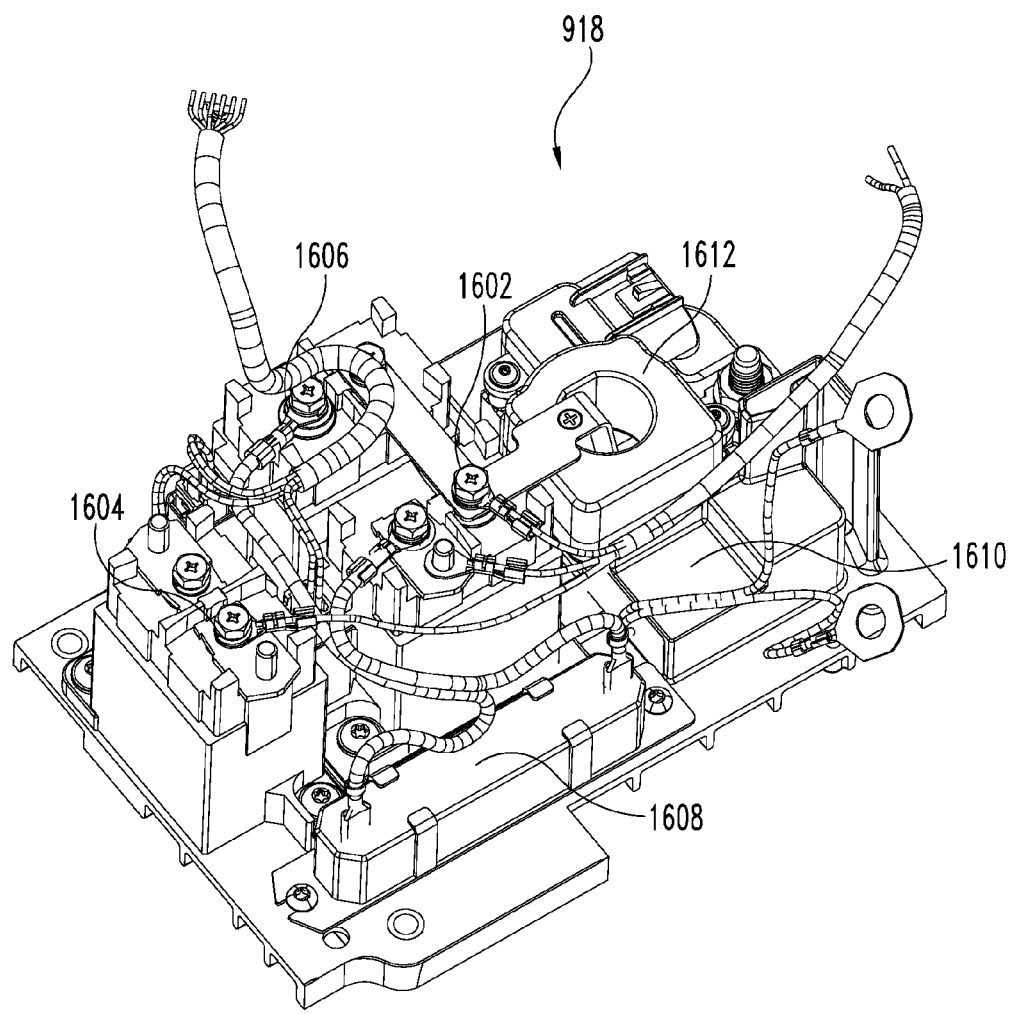
FIG. 16 is a perspective view of a bussed electrical center assembly according to one embodiment of the present disclosure.

FIG. 16 provides a more detailed view of the BEC 918. According to the illustrated embodiment, the BEC 918 is a single serviceable unit which can be replaced as a whole. The BEC 918 comprises a positive contact 1602, a negative contact 1604, and a pre-charge contactor 1606. The contacts 1602, 1604, 1606 connect the battery arrays 902, 904 to the appropriate electrical connections within the high voltage junction box 308. Accordingly, the contacts 1602, 1604, 1606 work in conjunction with the HVIL 606 to disconnect the high voltage from the rest of the vehicle. A pre-charge resistor 1608 is provided to slowly charge the inverter 132 when energy is delivered from the energy storage module 136 during vehicle start-up. A Y-cap 1610 is provided to reduce high frequency noise from the DC wires. A current sensor 1612 monitors the amount of high voltage current flowing in or out of the energy storage module 136. That information is optionally provided to the controller module 908. If the current exceeds a certain threshold, the high voltage interlock 606 is triggered and the high voltage power is disconnected from the electronics within the high voltage junction box 308. In one embodiment, current sensor 1612 is a dual range sensor.

Figure 17:
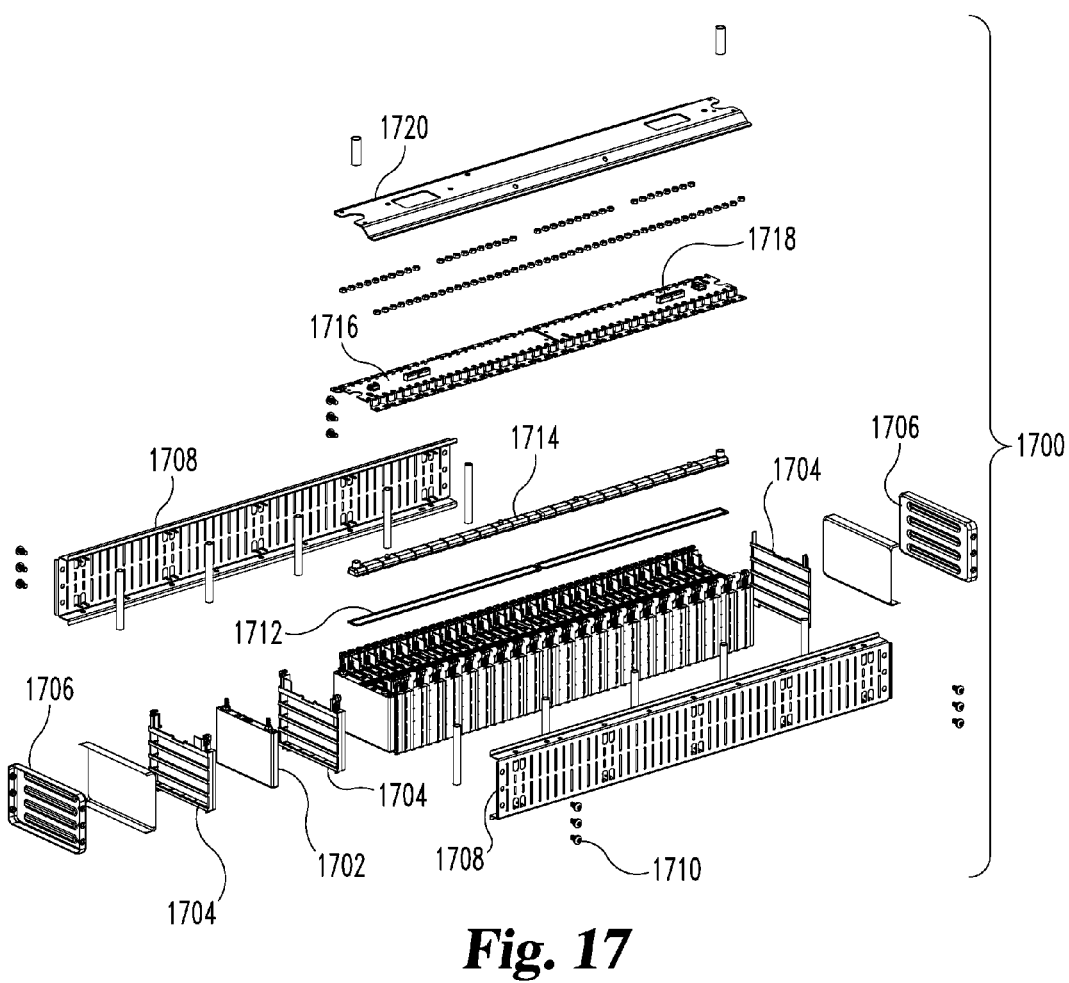
FIG. 17 is an exploded view of a battery array assembly according to one embodiment of the present disclosure.

FIG. 17 is an exploded view of a battery array 1700. The battery array 1700 comprises a plurality of battery cells 1702 separated from one another by a cell retainer 1704. The battery cells 1702 are secondary batteries capable of being repeatedly charged and discharged, such as, but not limited to, nicad (Ni—Cd), nickel-hydride, and/or lithium-ion types. Battery cells manufactured by Samsung, Sanyo and GS Yuasa Corporation have been found to be acceptable depending upon design and size considerations.

At each end of the battery array 1700 is an end plate 1706, which works in conjunction with two side rails 1708 to hold the battery cells 1702 and the cell retainers 1704 in place. Once the battery cells 1702, cell retainers 1704, end plates 1706, and side rails 1708 are properly aligned, the structure is held together by a series of screws 1710, though other known means may be used. In one embodiment, the battery array 1700 is made up of forty six individual battery cells 1702.

A series of seals 1712 is sandwiched between vent manifold sections 1714. The ends of the vent manifold sections 1714 are constructed and arranged to connect with the exhaust vent manifold 1124. Above the vent manifold assemblies 1714 are positioned a voltage sense board 1716, followed then by a safety cover 1720. The voltage sense board 1716 includes a harness connection 1718 which is constructed and arranged to connect with the high voltage harness 906.

Figure 18:
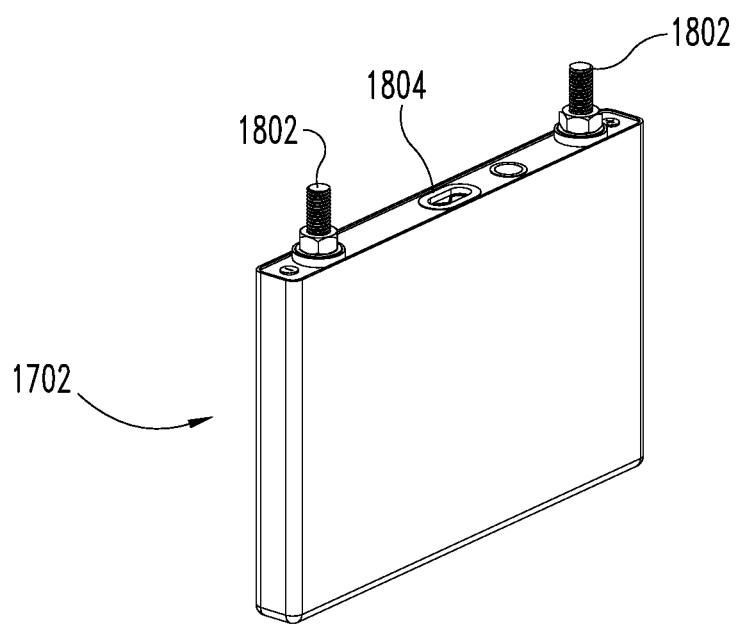
FIG. 18 is a perspective view of a battery cell.

FIG. 18 is a perspective view of an individual battery cell 1702. The battery cell 1702 includes two terminals 1802 and a vent 1804. The terminals 1802 provide a contact point upon which high voltage energy can be passed in order to be stored within the cell 1702. The terminals 1802 also provide a contact point upon which high voltage energy can be extracted from the battery cell 1702 in order to provide power to the hybrid vehicle system. The vent 1804 provides a specific location in which exhaust gases may be expelled in the event the battery cell 1702 is abused, overheats, or malfunctions.

Figure 20:
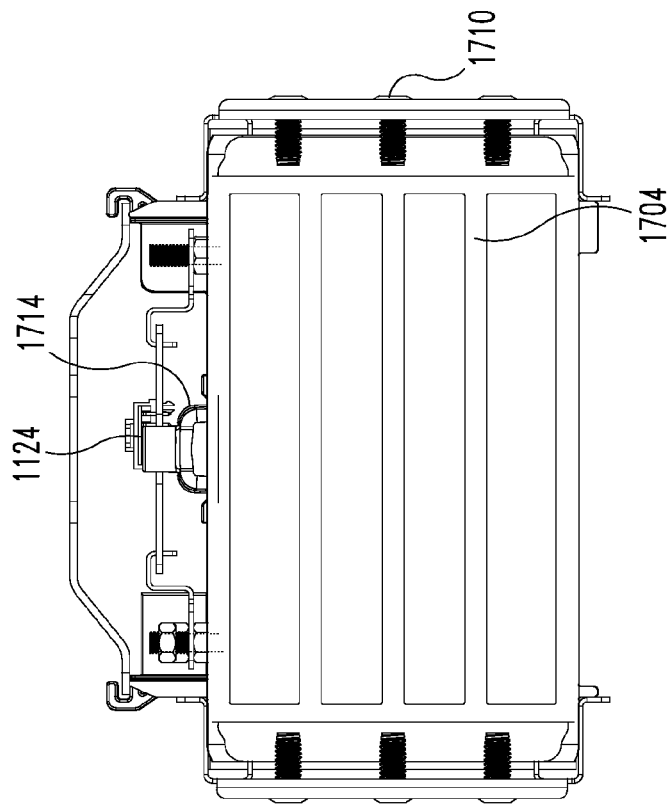
FIG. 20 is a further end, cross-sectional view of a battery array and plenum assembly according to one embodiment of the present disclosure.
Figure 19:
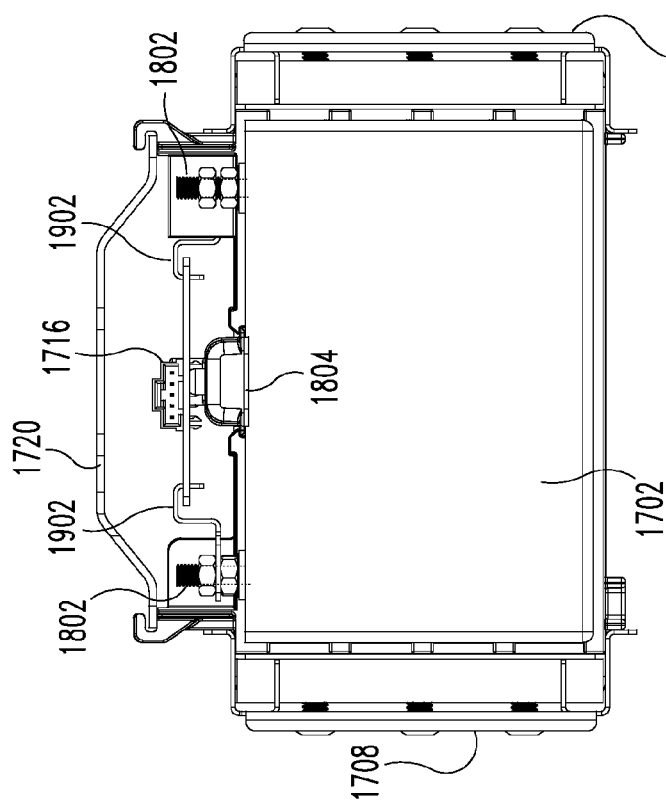
FIG. 19 is an end, cross-sectional view of a battery array and plenum assembly according to one embodiment of the present disclosure.

FIGS. 19 and 20 illustrate an end view of the battery array 1700 when installed within the energy storage module. Buss bars 1902 provide an electrical connection between the voltage sense board 1716 and the cell terminals 1802. Additionally, it is noted that cell vent 1804 is positioned directly beneath the vent manifold section 1714, which is in turn connected to the vent manifold 1124. Such an arrangement ensures that any harmful or noxious gases expelled from the battery cell 1702 are properly exhausted from the energy storage module 136.

Figure 21:
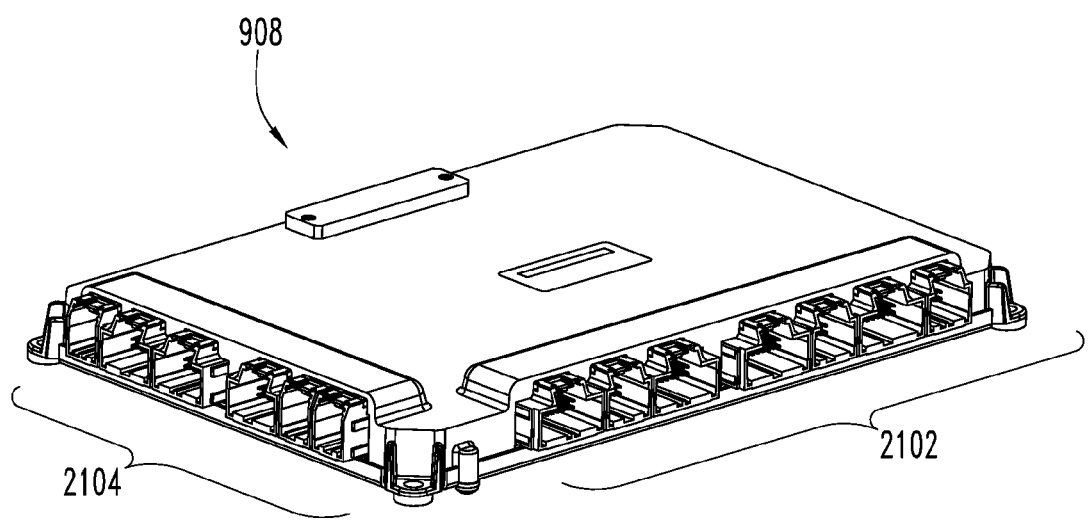
FIG. 21 is a perspective view of an energy storage controller module according to one embodiment of the present disclosure.

FIG. 21 is a perspective view of the controller module 908. Disposed along one edge of the controller module 908 is a plurality of high voltage connections 2102. As discussed hereinabove, the high voltage connections 2102 are principally used to receive the high voltage harness 906 which is connected to the battery arrays 902, 904. Through the high voltage harness 906, the controller module 908 can individually monitor the state of charge of each individual battery cell 1702 within the battery arrays 902, 904. The controller module 908 can also control the charge and discharge of the battery arrays 902, 904.

Disposed along a different edge of the controller module 908 is a plurality of low voltage connections 2104. The low voltage connections 2104 are connected to various components within the energy storage module 136, such as, but not limited to, low voltage harness 910, thermistor high harness 1026 and a thermistor low harness 1028. The low voltage harness 910 is communicatively connected to the vehicle signal connector assembly 814. Additional components within the energy storage module may also be communicatively connected to the controller module 908 via high voltage harness 906, low voltage harness 910, or through other harnesses or connections.

According to one aspect of the present disclosure, the energy storage modules 136 within the energy storage system 134 are adapted to communicate with one another. In order to provide the communicative connection, the energy storage module data link 204 is provided between each energy storage module 136. In one embodiment and generally referring also to FIG. 8, one energy storage module 136 functions as the master energy storage module 802 while the others function as the slave energy storage modules 804. The controller module 908 within the master energy storage module 802 then receives information from the slave energy storage modules 804 and communicates with the transmission/hybrid control module 148 and the rest of the hybrid system as a single energy storage system 134. As discussed herein, the transmission/hybrid control module 148 receives power limits, capacity available current, voltage, temperature, state of charge, status, and fan speed information from the energy storage system 134 and the various energy storage modules 136 within. The transmission/hybrid control module 148 in turn sends commands for connecting the various energy storage modules 136 so as to supply voltage to and from the inverter 132.

Because the controller modules 908 within the energy storage modules 136 are identical, it does not matter which energy storage module is in the "master" position. According to one embodiment of the present disclosure, the controller modules 908 are adapted to periodically verify that the master energy storage module 802 is still functional. If not, a slave energy storage module 804 then begins to function as the master energy storage module and communicates with the transmission/hybrid control module 148, thereby providing system redundancy. According to the principles of the present disclosure, a separate controller box or structure is not necessary and energy storage modules 136 can be easily interchanged. Additionally, the principles of the present disclosure further provide an energy storage system 134 in which the entire system remains functional even in the event that the master module 802 becomes inoperable. In one embodiment, the energy storage modules 136 are instructed to be a master or slave module based upon a received address which is programmed by the jumpers within low-voltage signal connector 314.

Though not illustrated, controller module 908 optionally includes a memory component. The memory component may be any known memory device, such as, but not limited to, non-volatile memory, a hard disk drive, magnetic storage device, optical storage device, RAM, or ROM, just to name a few examples. Non-volatile memory is adapted to record energy storage module usage and status history, such as achieved power levels and duty cycles, to name a few examples. The memory provides an effective serviceability tool in which energy storage module component performance can be quickly obtained and evaluated. The controller 908 may include additional components, such as a microprocessor capable of performing the various control, communication, and switching functions.

Figure 22:
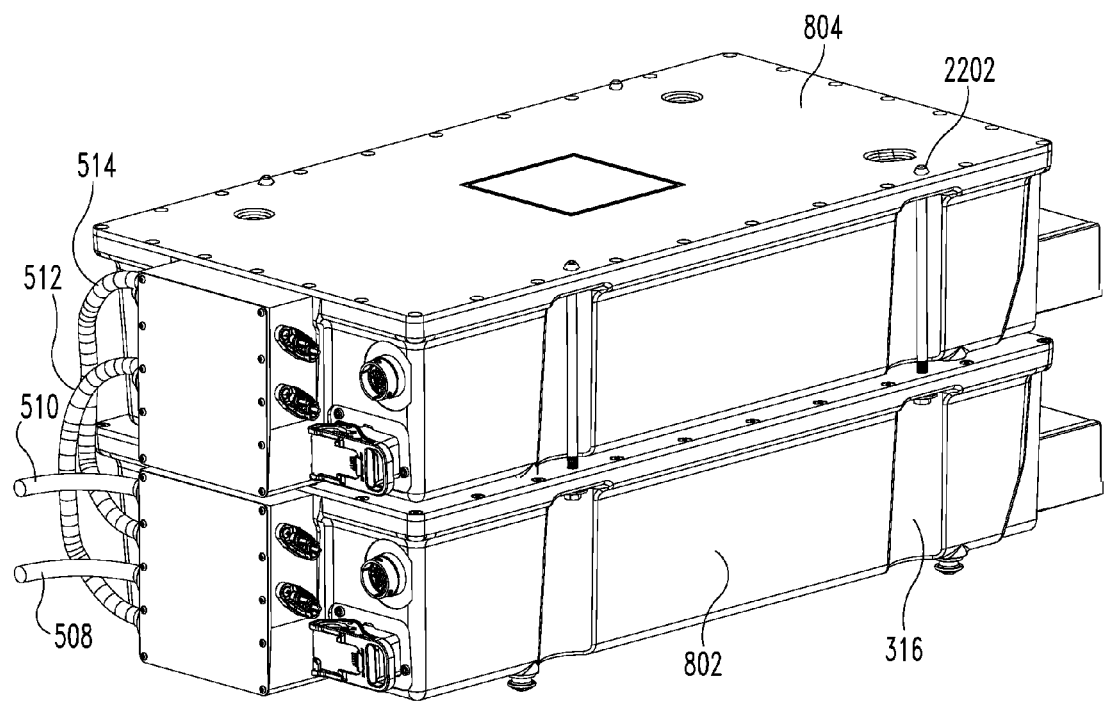
FIG. 22 is a perspective view of an energy storage module stacking arrangement according to one aspect of the present disclosure.

In order to stack multiple energy storage modules 136 on top of one another, various embodiments are contemplated. FIG. 22 illustrates one such embodiment. While FIG. 8 and the associated discussion primary dealt with the electrical connections between the master energy storage module 802 and the slave energy storage module 804, FIG. 22 concerns the physical arrangement and connection of the two. As shown, the slave energy storage module 804 is stacked upon the master storage module 802. A plurality of bolts 2202 are provided through mounting holes 1024 of both storage modules 802, 804. The indentations 316 are located near holes 1024 and run along the height of the energy storage modules 136 to provide sufficient clearance for the torque wrench or other device used to tighten the bolts 2202 during the stacking of the storage modules 802, 804. With four bolts 2202 in place, the stacked arrangement is strong enough to withstand considerable vibration and shock loads. As can be appreciated by those of skill in the art, more or less bolts 2202 and mounting holes 1024 may be provided.

According to one aspect of the present disclosure, the energy storage modules 136 are constructed such that they may be mounted in any arrangement, direction, or orientation. For example, the master energy storage module 802 may be stacked upon the secondary energy storage module 804. In other embodiments, the energy storage modules are not stacked upon each other but are positioned in various locations within the HEV.

Figure 23:
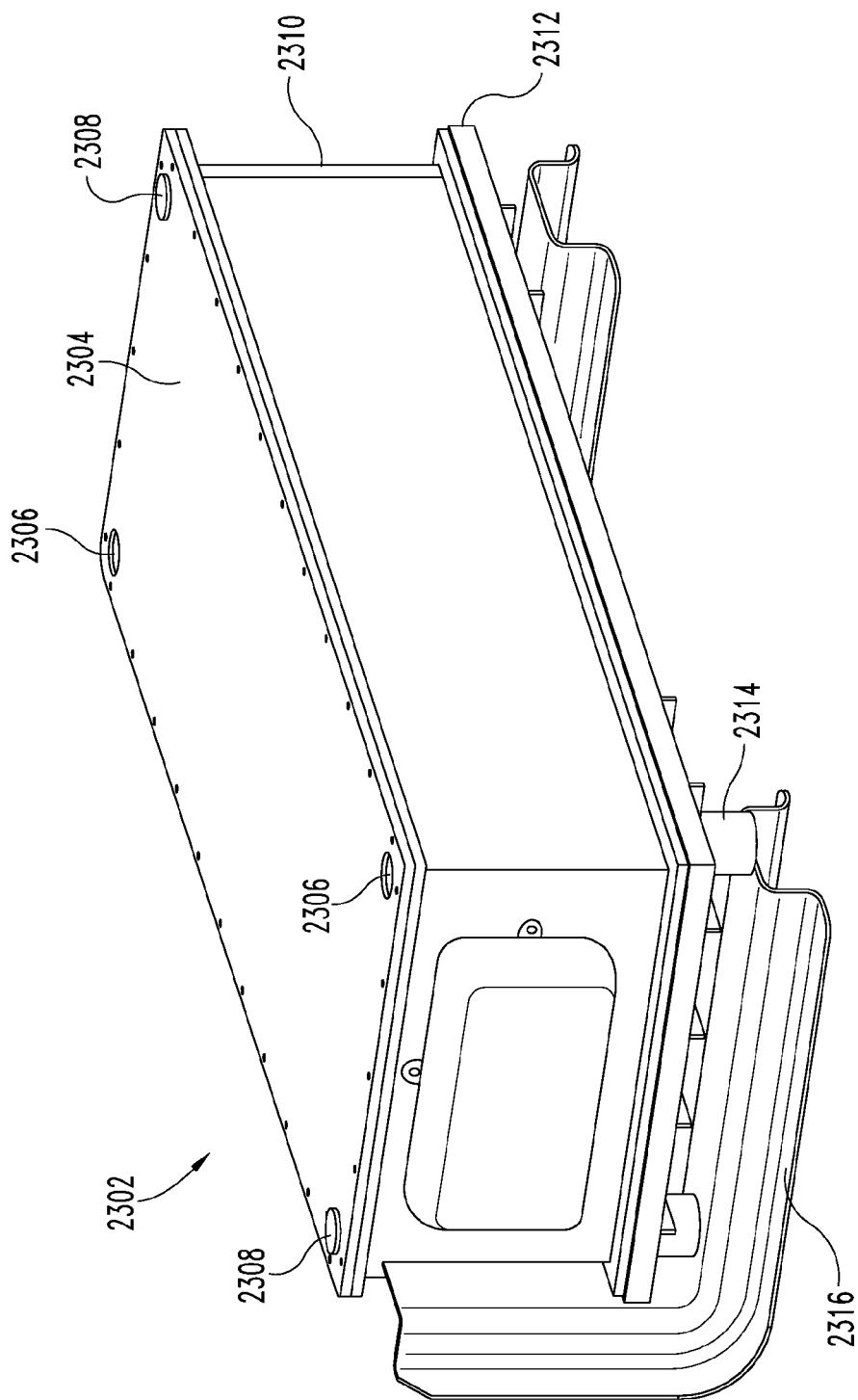
FIG. 23 is a perspective view of an energy storage module vehicle mounting arrangement according to one aspect of the present disclosure.

FIG. 23 depicts a frame mounting concept. An energy storage module 2302 comprises a lid 2304 having a receiving element 2306 and a raised element 2308. The receiving element 2306 and the raised element 2308 allow for additional energy storage modules 2302 to be securely stacked upon one another. The energy storage module 2302 further comprises a housing 2310 constructed and arranged to sit upon and be mounted to the mounting plate 2312. The mounting plate 2312 includes a plurality of feet 2314 which are fixed to vehicular frame 2316. In one embodiment, the energy storage module 2302 is dimensioned to fit within the area typically reserved for a heavy duty truck fuel tank.

Figure 24:
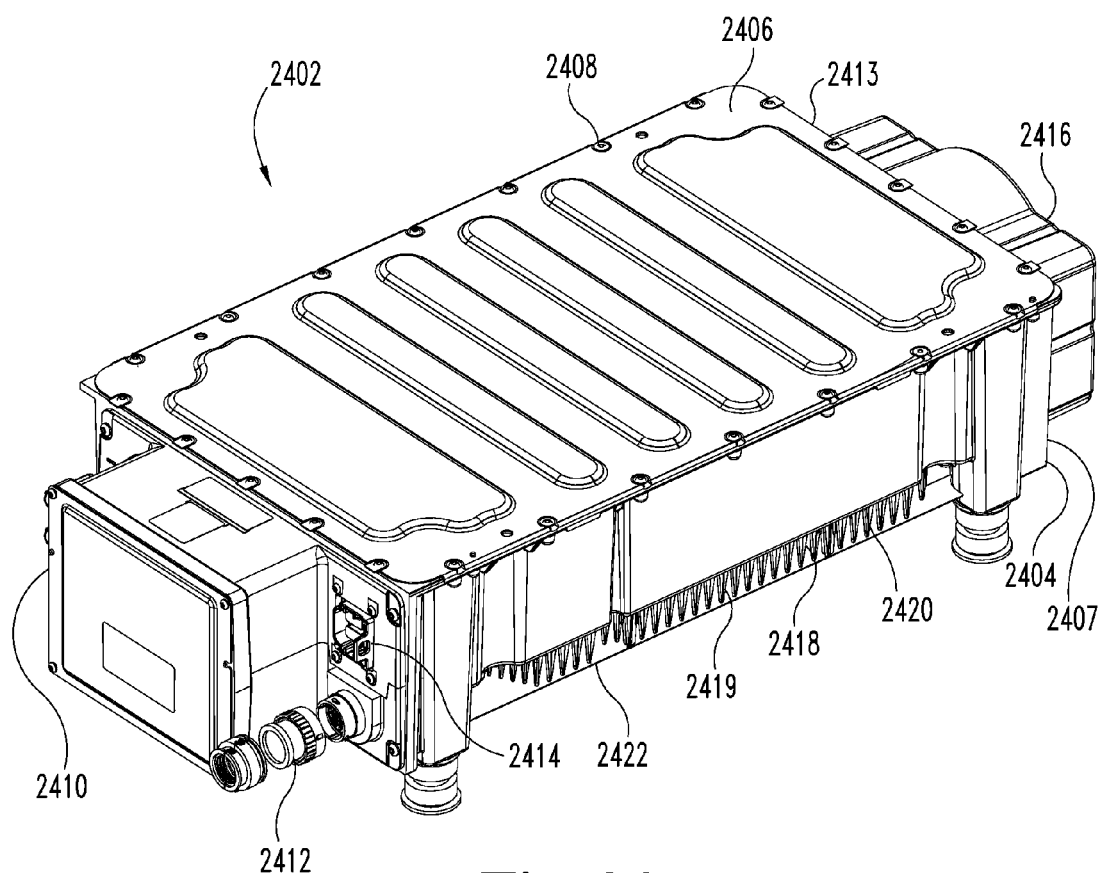
FIG. 24 is a front perspective view of an energy storage module according to one embodiment of the present disclosure.
Figure 25:
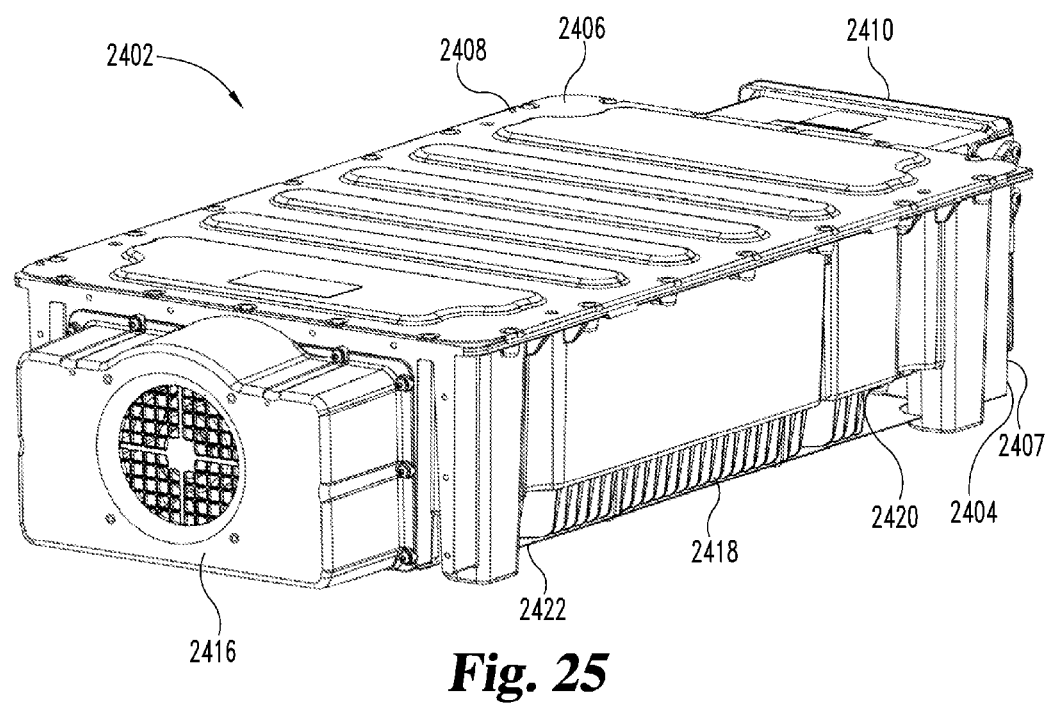
FIG. 25 is a rear perspective view of the energy storage module depicted in FIG. 24.

FIGS. 24 and 25 depict another embodiment of an energy storage module 2402, similar to energy storage module 136, but with an external fan housing 2416 and heat sink 2418. The energy storage module 2402 includes an enclosure 2404 having an upper cover 2406 which is secured to lower housing 2407 by screws 2408 as shown, although other methods known in the art may be used to secure the upper cover 2406. The upper cover 2406 is preferably sealed to lower housing 2407 to prevent outside contaminants from entering the enclosure 2404. A high voltage junction box 2410, similar to high voltage junction box 308, is mounted to one end of the energy storage module 2402, along with a low voltage connector 2412 and service disconnect 2414.

The energy storage module 2402 employs internal conduction cooling and external convection cooling as will be described further below. The external fan housing 2416 is mounted to an opposite end 2413 of the enclosure 2404 with respect to the high voltage junction box 2410 as shown. Heat sink 2418 having fins 2419 is mounted to or formed integral to the bottom surface 2420 of the enclosure 2404. An enclosing plate 2422 is mounted to enclosure 2404 as shown to further direct air across the heat sink 2418. By using an external cooling fan and heat sink, the enclosure 2404 and high voltage junction box 2410 may be individually or collectively sealed from outside contaminants. The enclosure 2404 and high voltage junction box 2410 may be further adapted to be submersible, depending on the needs of the particular application.

Figure 26:
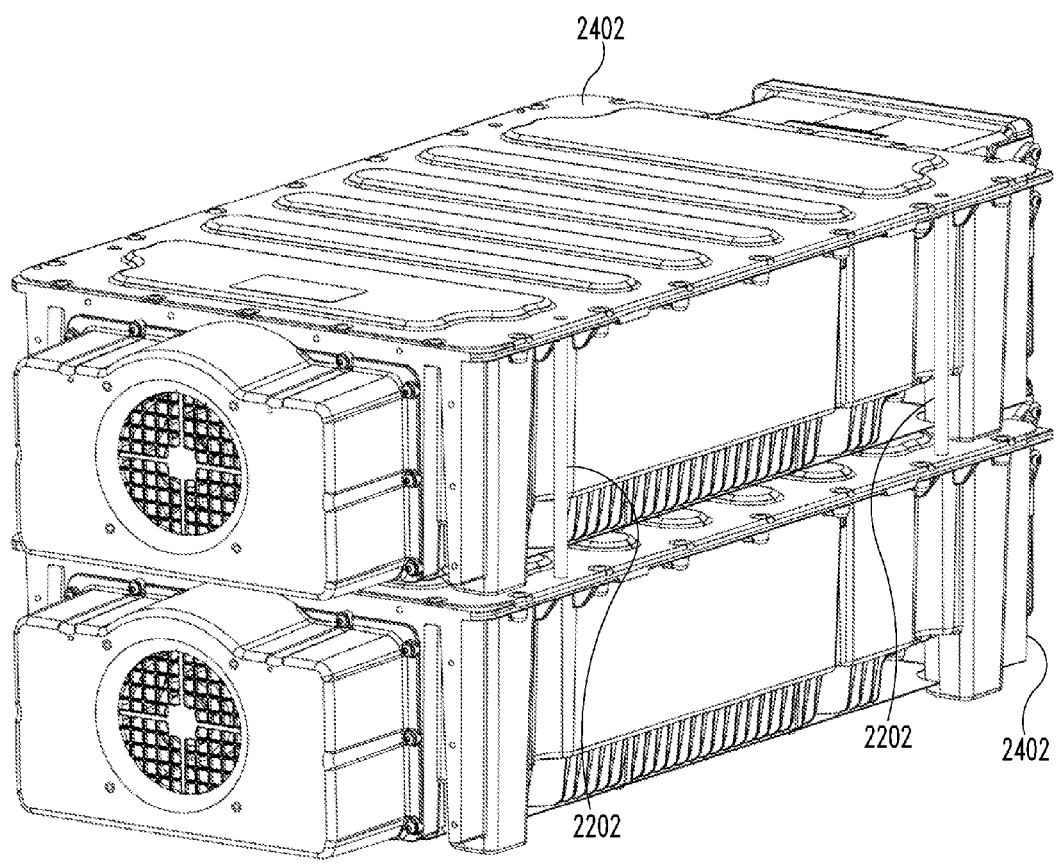
FIG. 26 is a rear perspective view of an energy storage module stacking arrangement according to one embodiment of the present disclosure.

FIG. 26 depicts an arrangement wherein two energy storage modules 2402 are stacked and electrically connected to provide increased operating voltage or current capacity as needed by the particular application. Again, bolts 2202 are included to secure the energy storage modules 2402 together.

Figure 27:
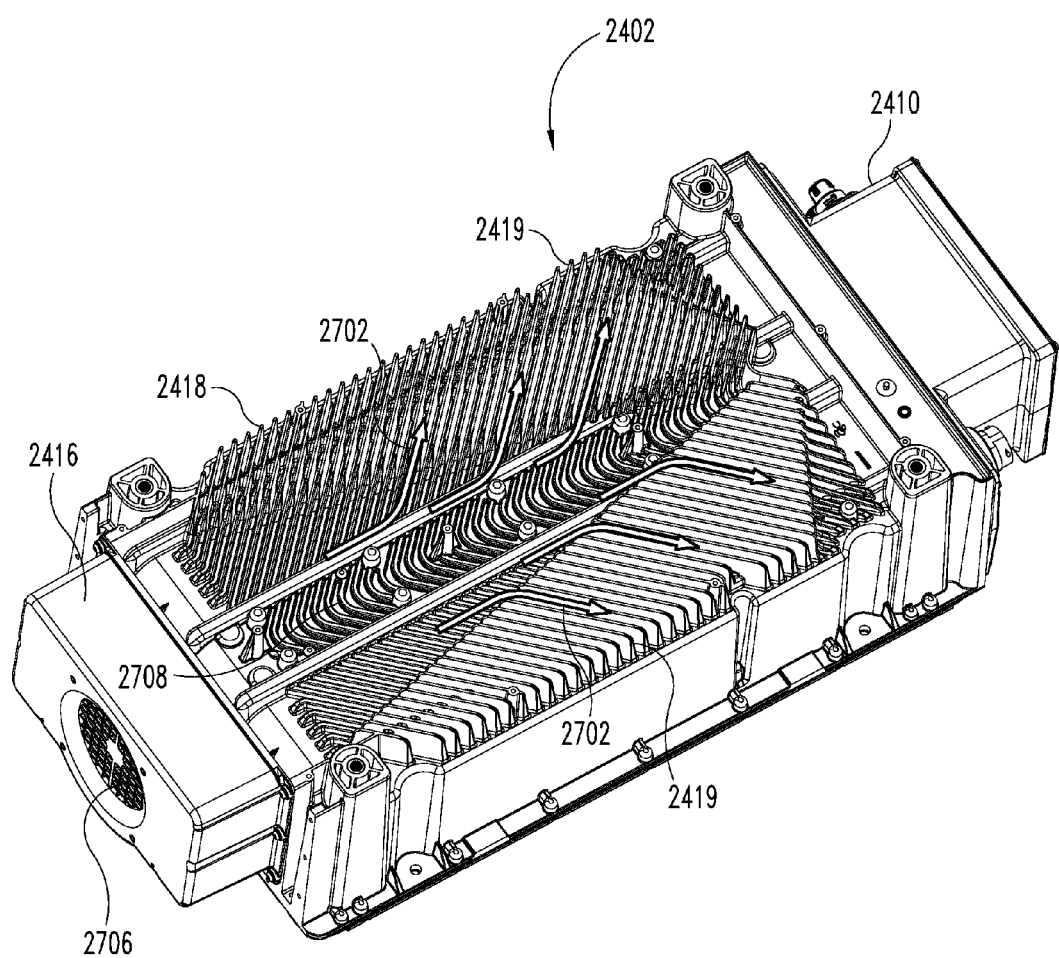
FIG. 27 is a lower rear perspective view of the energy storage module depicted in FIG. 24.
Figure 28:
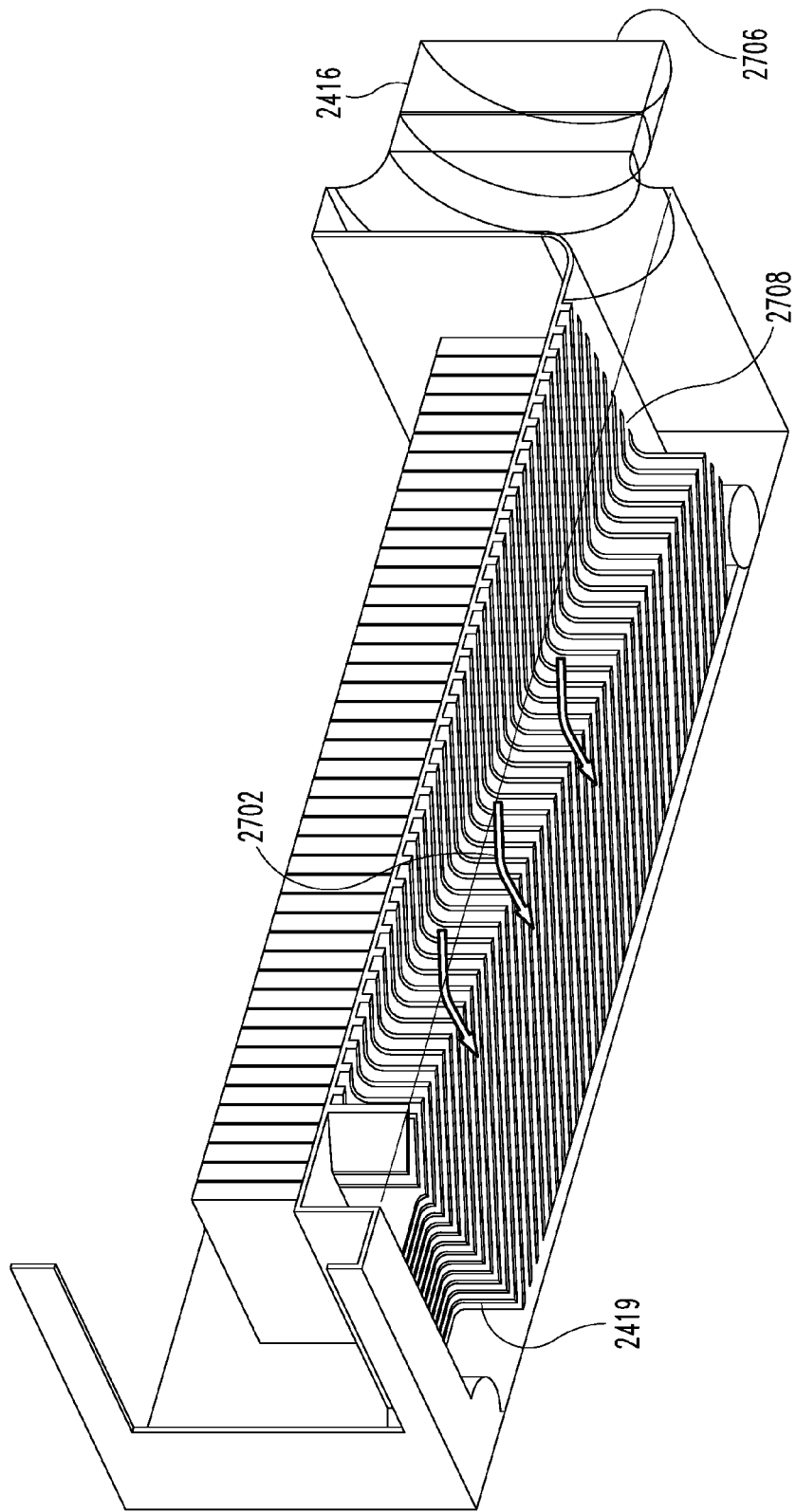
FIG. 28 is a lower front perspective view of a heat sink fin arrangement according to one embodiment of the present disclosure.

FIG. 27 depicts a bottom perspective view of the heat sink 2418 arrangement. As shown, the heat sink 2418 includes a plurality of fins 2419 which are disposed angularly outward with respect to the longitudinal dimension of the energy storage module 2402. When cooling is required, the fan 2706 directs air through a central cavity 2708 in the direction indicated by arrows 2702. The air is then directed between the fins 2719 in an angularly outward direction on each side of the energy storage module 2402. In order to provide a more uniform cooling in each battery cell, the height, length and/or relative spacing of the fins 2419 may be varied with the direction or speed of air flow. For example, the fins nearest the cooling fan 2706 may have a smaller height or length than those farther from the cooling fan 2706. FIG. 28 depicts a half-symmetry reverse perspective view of the heat sink 2418 which illustrates the varying height and length of the fins 2419.

Figure 29:
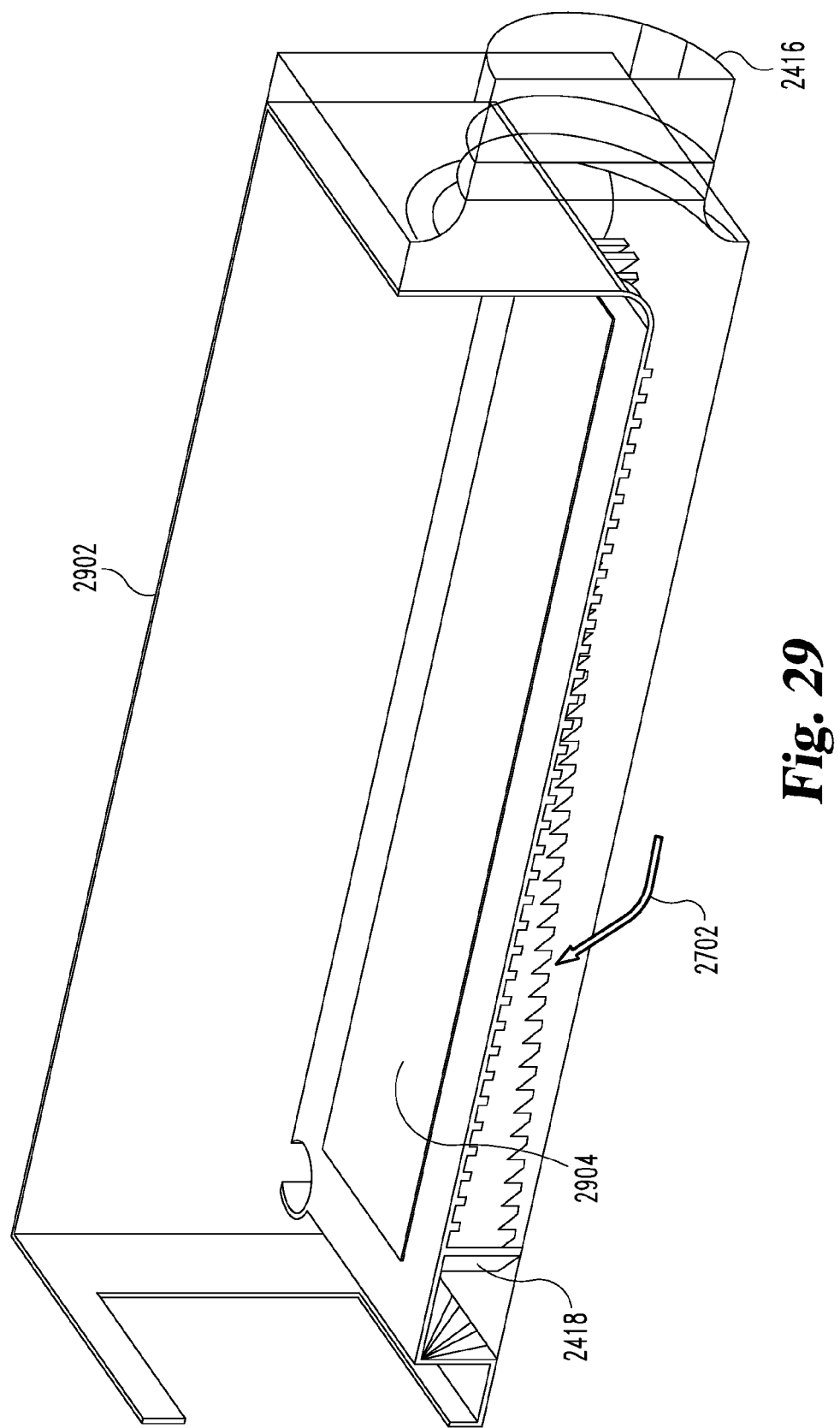
FIG. 29 is an upper rear perspective view of an energy store module having a thermal pad according to one embodiment of the present disclosure.

FIG. 29 depicts another partial diagrammatic half-symmetry perspective view of an energy storage module housing 2902 in which a battery thermal pad 2904 is disposed for mounting a battery array thereon. The thermal pad 2904 is constructed of a thermally conductive, yet electrically insulating, material such as Sil-Pad®, manufactured by The Bergquist Company. The thermal pad is preferably constructed as a single piece for each battery array to provide maximum thermal transfer. The thermal pad 2904 is preferably sized to be in the range of 70-120 in$^2$, although smaller and larger sizes may also be used. When a battery array is mounted on the thermal pad 2904, the thermal pad 2904 draws heat away from the battery array and into the heat sink 2418 by thermal conduction. As discussed above, the excess heat is then removed from the heat sink 2418 by convection due to the movement of air across the fins 2419.

Figure 30:
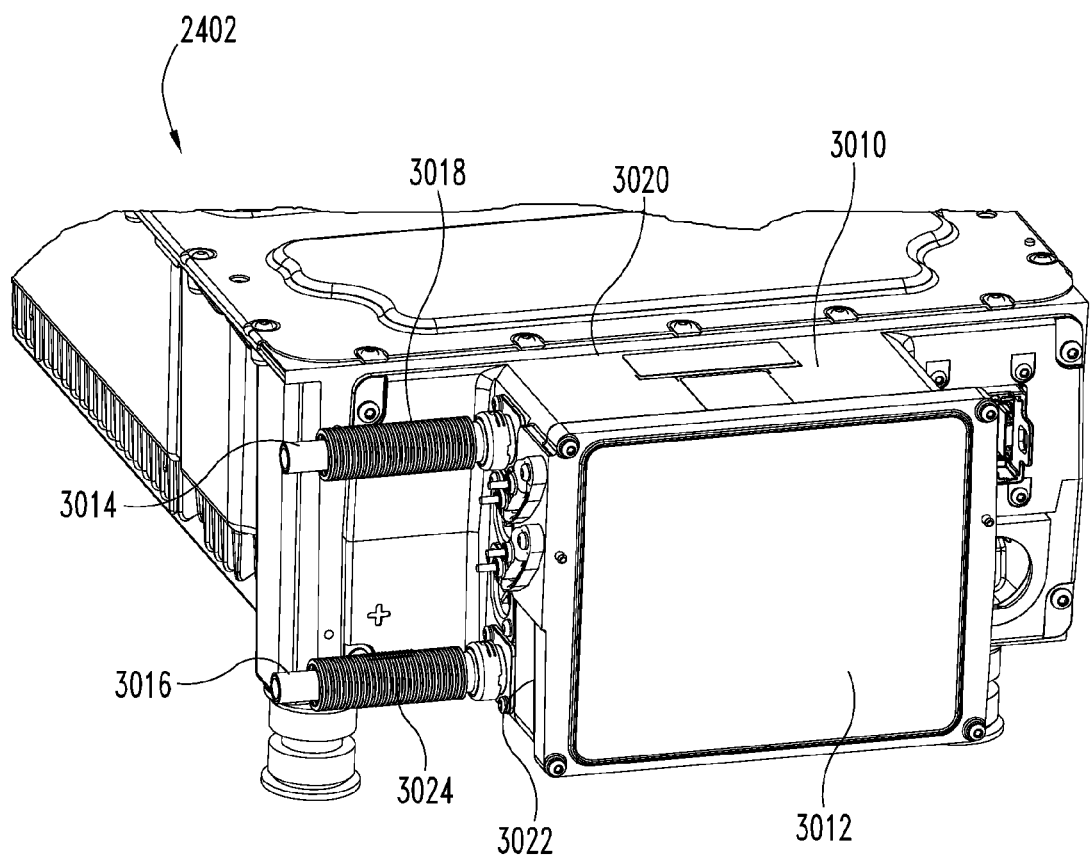
FIG. 30 is a front perspective view of a high voltage junction box of the energy storage module of FIG. 24.

FIG. 30 provides a more detailed view of one end of the energy storage module 2402 including the high voltage junction box 3010, similar to high voltage junction box 308. As shown, the front perimeter 3022 of the high voltage junction box 3010 is sealed and protected by an access cover 3012. The rear of the high voltage junction box 3010 is preferably open to a corresponding opening 3604 in the lower housing 2407 (see FIG. 36). The rear perimeter 3020 of the high voltage junction box 3010 may also be sealed about the opening 3604 of lower housing 2407 to allow the high voltage junction box 3010 and enclosure 2404 to collectively seal out foreign contaminants and/or be made submersible. High voltage conductors 3014 and 3016 are connected within the high voltage junction box 3010 and also preferably sealed to prevent entry of foreign contaminants. Strain reliefs 3018 and 3024 may be included to further secure the high voltage conductors 3014, 3016.

Figure 31:
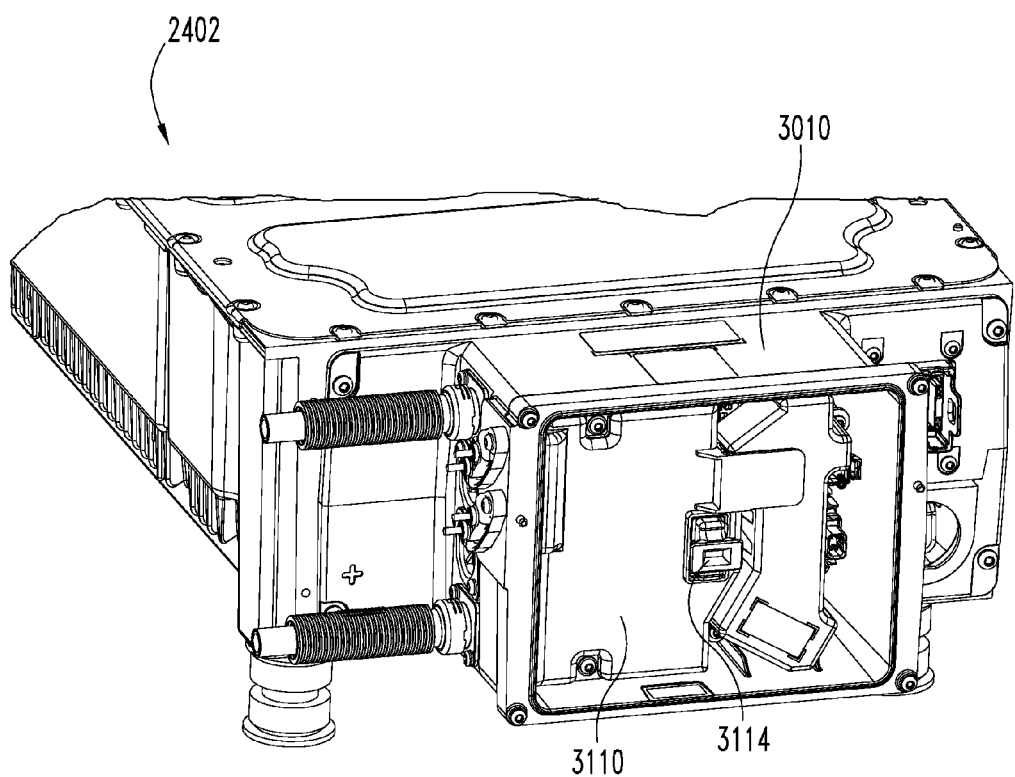
FIG. 31 is a front perspective view of the high voltage junction box of FIG. 31 with the access cover removed.

FIG. 31 depicts the high voltage junction box 3010 with the access cover 3012 removed. For precautionary purposes, a safety cover 3110 is provided to act as a further barrier to the high voltage terminals behind it, similar to safety cover 706 of FIG. 7B. In order to access the high voltage connections behind the safety cover 3110, a high voltage interlock (HVIL) resistor 3114 must first be removed.

Figure 32:
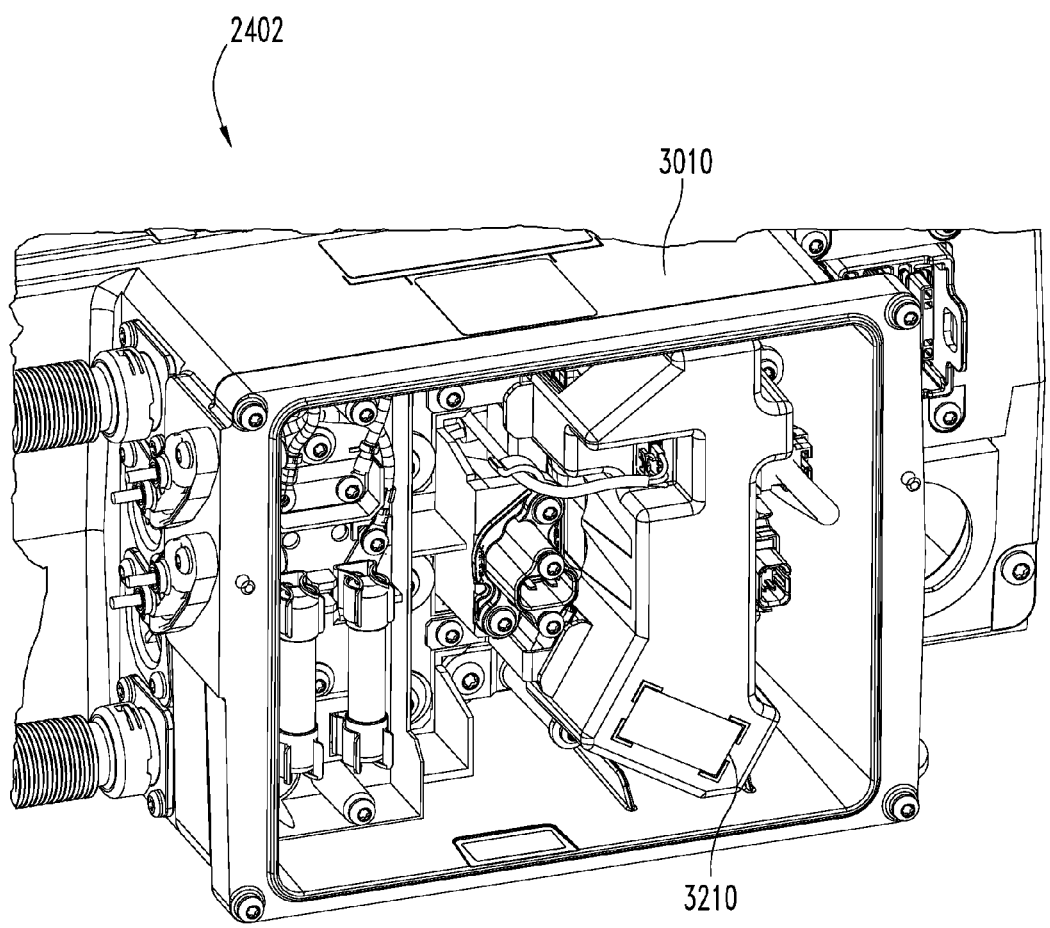
FIG. 32 is a front perspective view of the high voltage junction box of FIG. 31 with the inner safety cover removed.

FIG. 32 depicts the high voltage junction box 3010 with the safety cover 3112 and HVIL resistor 3114 removed. In the illustrated embodiment, a plug-in bussed electrical center (BEC) 3210 is located within the high voltage junction box 3010, and external to the enclosure 2404. By locating the BEC 3210 outside the enclosure 2404, the upper cover 2406 does not need to be removed when the energy storage module 2402 is being serviced. This decreases the safety risk to the technician and further prevents contaminants from unnecessarily reaching the components located within the enclosure 2404.

Figure 33B:
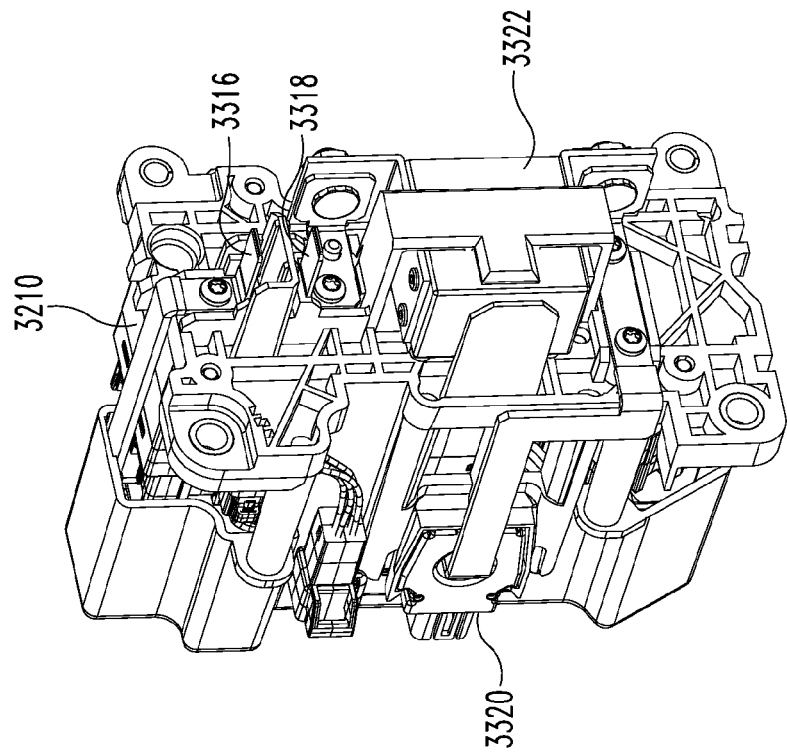
FIG. 33B is a rear perspective view of a plug-in bussed electrical center of the energy storage module of FIG. 24.
Figure 33A:
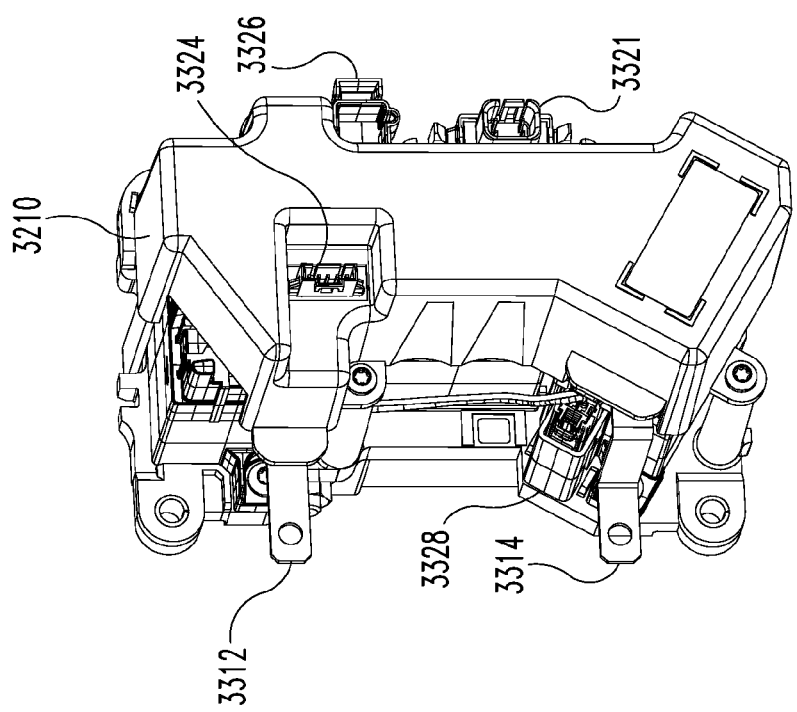
FIG. 33A is a front perspective view of a plug-in bussed electrical center of the energy storage module of FIG. 24.

As shown in FIGS. 33A and 33B, the plug-in BEC 3210 offer a further advantage in that it requires less manual connections during assembly or service, further decreasing the safety risk to the technician. More specifically, the high voltage connections between the plug-in BEC 3210 and the live battery arrays are made using bus bar blade terminals 3316 and 3318, which mate to corresponding receiving terminals in the high voltage junction box 3010 as the BEC 3210 is installed. Then, the terminals 3312 and 3314 which connect the plug-in BEC 3210 to the vehicle power systems may be connected. In other words, the operator does not have to manipulate flexible cables which might be connected to the live battery arrays when installing or removing the BEC 3210 for service. The plug-in BEC may also include a current sensor 3320, current sensor connector 3321, fuse block 3222, high voltage sense connector 3324, low voltage connector 3326, and high voltage contactors 3328.

Figure 34:
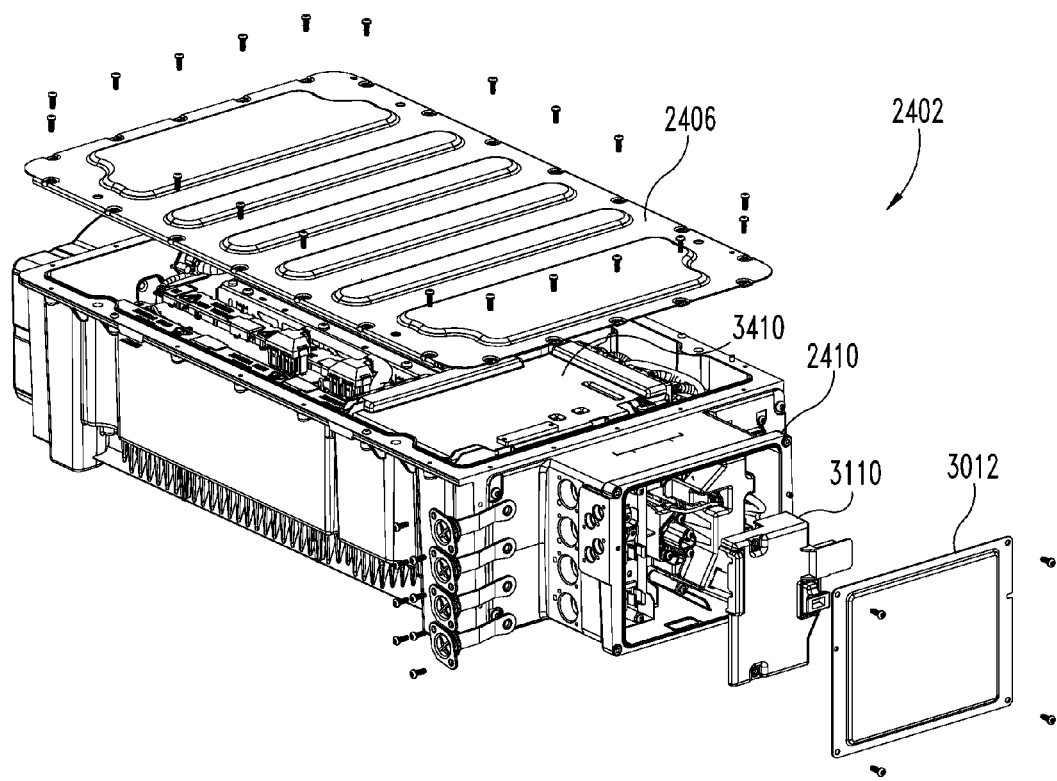
FIG. 34 is an exploded front perspective view of the energy storage module of FIG. 24.
Figure 35:
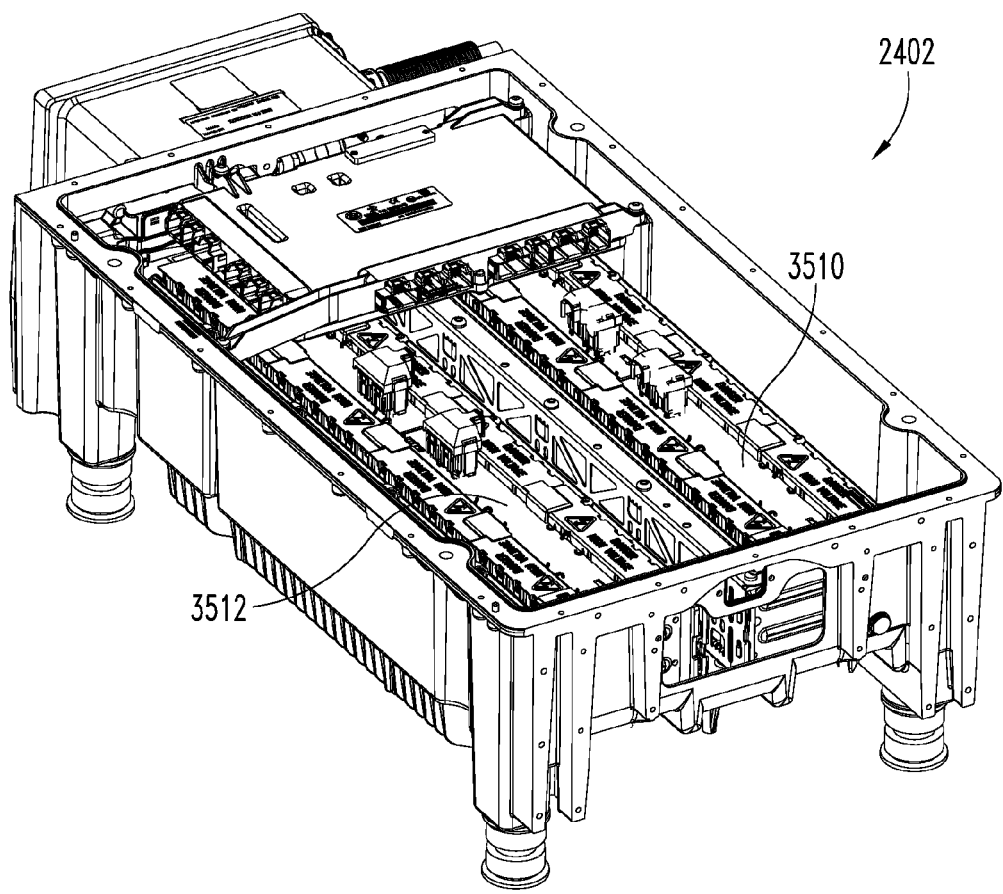
FIG. 35 is a rear perspective view of the energy storage module of FIG. 24 with the top cover and fan assembly removed.

FIG. 34 shows an exploded perspective view of the energy storage module 2402 with the upper cover 2406 removed. As shown, an energy storage controller module 3410, similar to energy storage+controller module 908 of FIG. 9, is mounted within the enclosure 2404 in an alternate arrangement. FIG. 35 shows a reverse perspective view of the energy storage module 2402 with the upper cover 2406 and fan housing 2416 also removed. As shown, the energy storage module 2402 includes two battery arrays 3510 and 3512, which are similar in function to the battery arrays 902 and 904 of FIG. 9.

Figure 36:
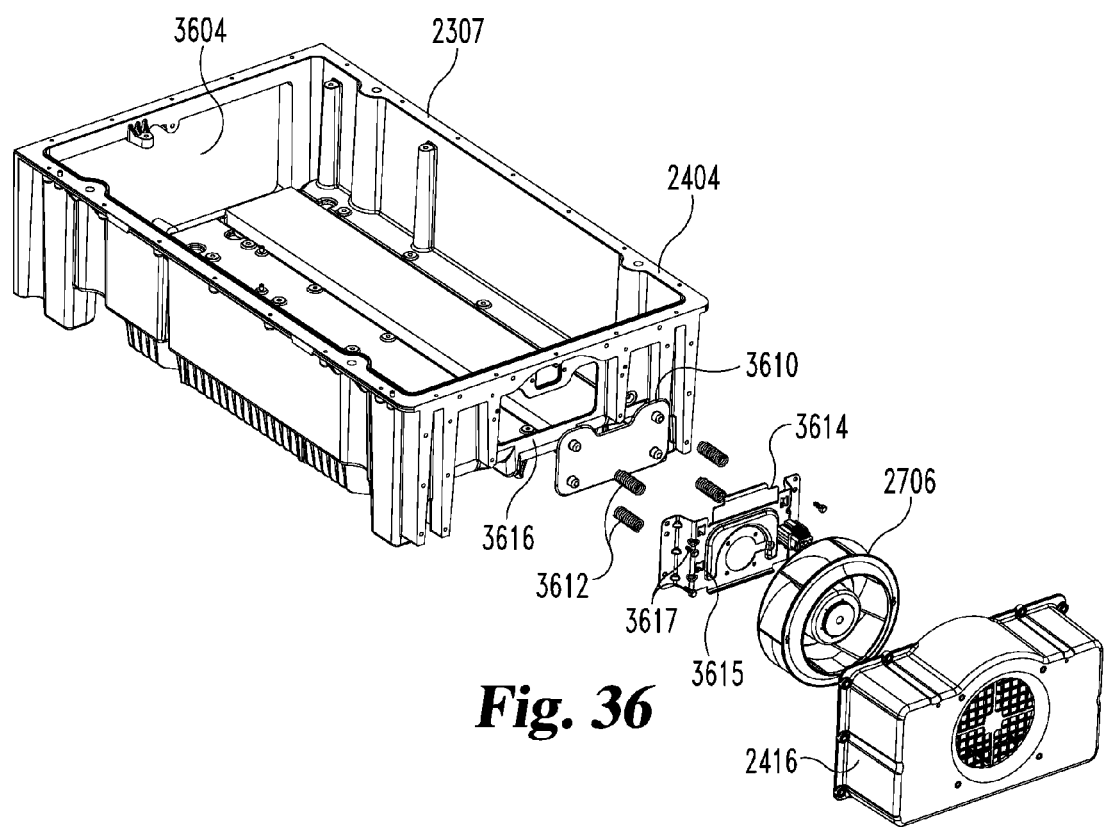
FIG. 36 is an exploded rear perspective view of the energy storage module of FIG. 24.
Figure 37:
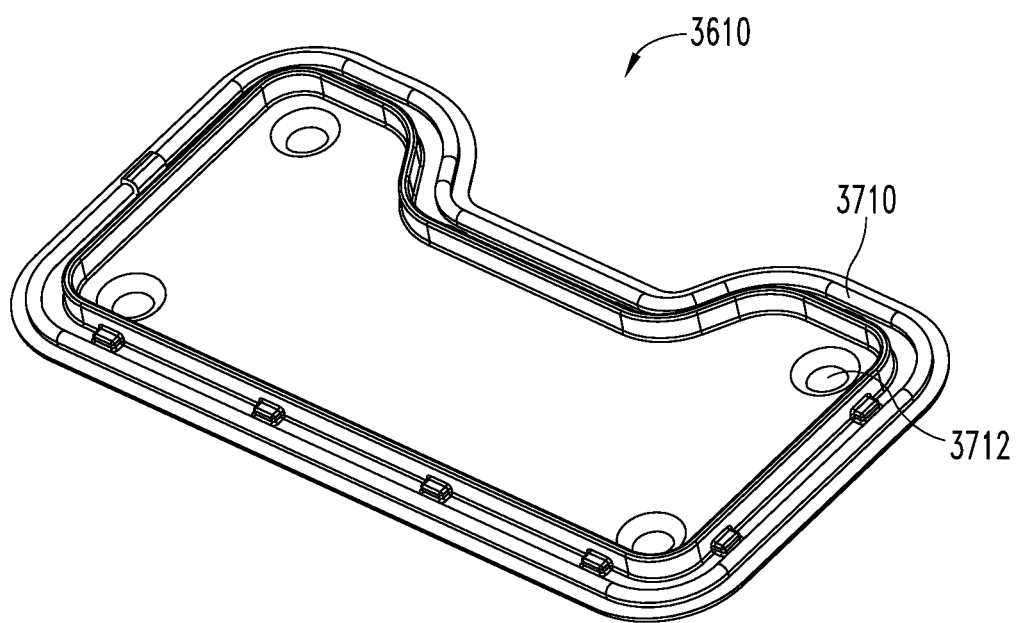
FIG. 37 is a perspective view of a pressure relief panel of the energy storage module of FIG. 24 according to one embodiment.

FIG. 36 shows an exploded view of the fan housing 2416. Because the energy storage module 2402 is implemented as a sealed or submersible unit, battery gases escaping from the battery cells within battery arrays 3510 and 3512 will be trapped within the enclosure 2404. The resulting increased pressure may damage the enclosure 2404 and associated seals. A pressure relief panel 3610 is therefore provided to allow the battery gases to escape if the pressure reaches a predetermined threshold. As shown in further detail in FIG. 37, the pressure relief panel 3610 includes a compliant seal 3710 which seals a vent opening 3616 in the enclosure 2404. The pressure relief panel 3610 and seal 3710 are held against the vent opening by bracket 3614 in conjunction with springs 3612. The bracket 3614 is secured to the enclosure 2404 with fasteners, such as screws 3617. Springs 3612 are held between the bracket 3614 and pressure relief panel 3610 and hold the pressure relief panel 3610 in place. The springs 3612 may be laterally secured by protrusions 3712 in the pressure relief panel and corresponding protrusions 3615 in the bracket 3614. The protrusions 3712 and 3615 extend into the interior of springs 3612 when the unit is assembled. The springs are selected to allow the pressure relief panel 3610 to temporarily move outward from the lower housing 2407 at the selected threshold pressure, compressing the springs and relieving the pressure inside the enclosure 2404. Once the pressure is relieved, the springs force the pressure relief panel 3610 back against the lower housing 2407, resealing the enclosure 2404.

Figure 38:
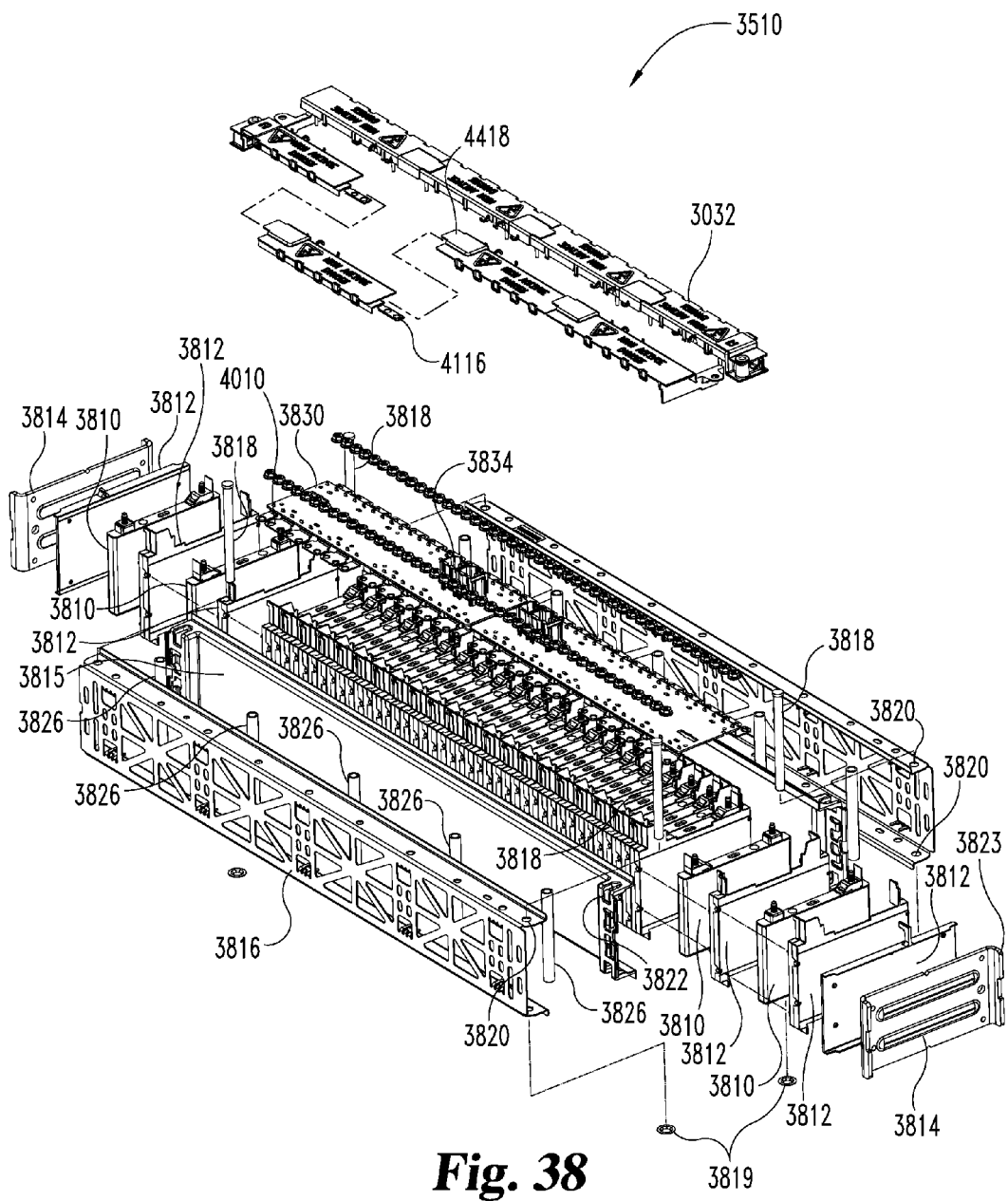
FIG. 38 is an exploded perspective view of a battery array according to one embodiment of the present disclosure.

FIG. 38 shows an exploded view of one of the battery arrays 3510, 3512. As shown, the battery array 3510 includes a plurality of battery cells 3810 separated from one another by cell retainers 3812, in a similar fashion to the battery cells 1702 of FIG. 17. The cell retainers 3812 may be formed from an insulative material, such as plastic or other suitable dielectric, and are of sufficient thickness to limit heat transfer between individual battery cells 3810 to an acceptable level. In the case where a cell 3810 develops an internal short and heats up before venting, the insulative property of the cell retainer 3812 will reduce the amount of heat that propagates to adjacent cells 3810. This allows the heat in the shorted cell to escape through other cooling paths, preventing nearby cells from heating up and venting themselves. Again, the battery cells 3810 are secondary batteries capable of being repeatedly charged and discharged, such as, but not limited to, nicad (Ni—Cd), nickel-hydride, and/or lithium-ion types. Battery cells manufactured by Samsung, Sanyo and GS Yuasa Corporation have been found to be acceptable depending upon design and size considerations.

At each end of the battery array 3510 is an end plate 3814, which works in conjunction with two side rails 3816 to hold the battery cells 3810 and the cell retainers 3812 in place. An insulation liner 3815 may also be included which improves creepage and clearance of the battery cells 3810 when assembled. Compression limiters 3826 may also be provided to provide additional strength when the side rails 3816 are implemented as trusses, as shown in FIG. 38. Once the battery cells 3810, cell retainers 3812, end plates 3814, and side rails 3816 are properly aligned, the structure is held together by pins 3818 and nuts 3819. The pins 3818 are inserted through holes 3820, 3822 in the side rails 3816 and insulation liners 3815, respectively. The end plates 3814 include flanges 3823 which secure the end plates 3814 behind the pins 3820. The pin arrangement provides more secure holding and helps prevent torque loosening during operation. In one embodiment, the battery array 1700 is made up of forty six individual battery cells 1702.

Figure 39:
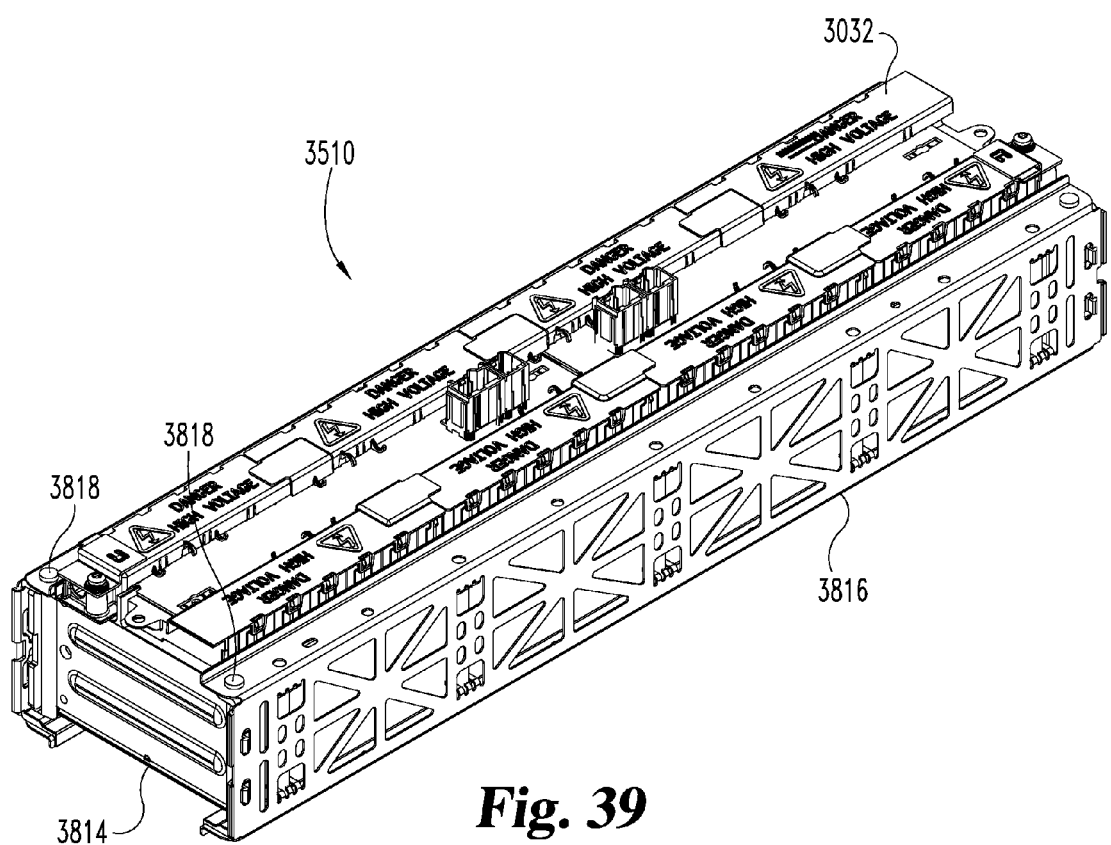
FIG. 39 is a perspective view of an assembled battery array according to one embodiment of the present disclosure.

Voltage sense board assembly 3830 is installed above the battery cells, followed by safety covers 3032. The safety covers 3032 are constructed from plastic or other appropriate electrically insulating material. The voltage sense board assembly 3830 includes a harness connection 3834 which is constructed and arranged to connect to the controller module 3410 and/or plug-in BEC 3210. FIG. 39 shows a perspective view of the assembled battery array 3510.

Figure 40:
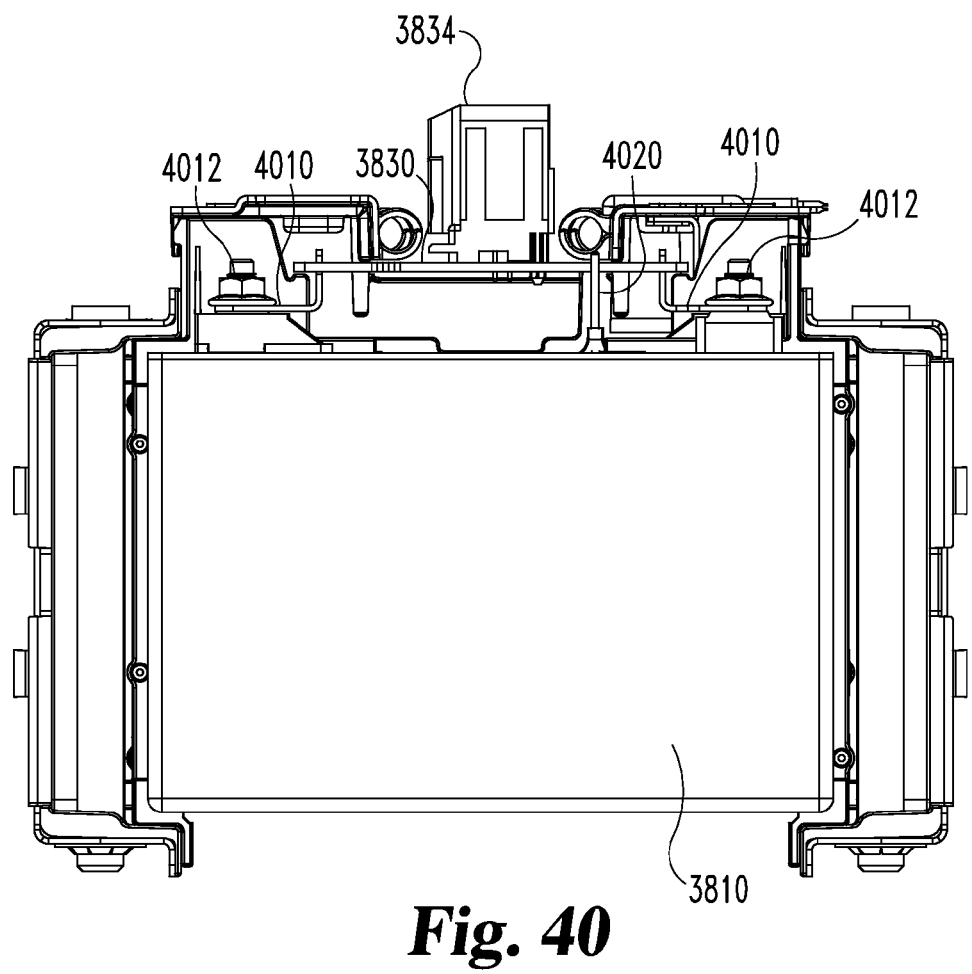
FIG. 40 is front view of the battery array of FIG. 39 showing an individual battery cell mounted in the battery array.

FIG. 40 illustrates an end view of a battery cell 3810 mounted within the battery array 3510. Bus bars 4010 provide an electrical connection between the voltage sense board assembly 3830 and the cell terminals 4012, connecting the positive terminal of one battery cell to a negative terminal of an adjacent battery cell. This results in a series electrical connection between the battery cells 3810, collectively providing the desired total array voltage. Thermistor 4020 may be included to monitor the temperature of the battery cell 3810 and communicate the temperature reading to controller module 3410.

Figure 41:
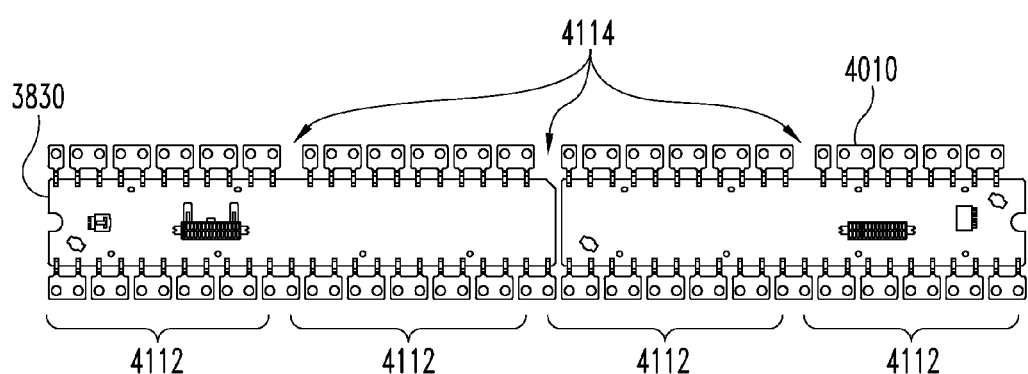
FIG. 41 is a top view of a voltage sense board assembly according to one embodiment of the present disclosure.

In certain embodiments, the voltage sense board assembly 3830 is initially provided with certain bus bars 4010 missing as shown by arrows 4114 in FIG. 41. Due to the missing bus bars, the voltage sense board 3830 is electrically divided into voltage sections 4112 until near the end of the assembly process. The covers 3032 include the missing or final bus bars (indicated as 4116 in FIG. 38) which complete the missing connections as each individual cover 3032 is installed in sequence. The covers 3032 include an insulated overlap portion 4118 which covers the final bus bar 4116 of the adjacent cover 3032. The result is that the technician is only exposed to a limited safe voltage level (e.g., less than 50 volts) from the exposed battery cell terminals until the final connections are made.

Figure 42:
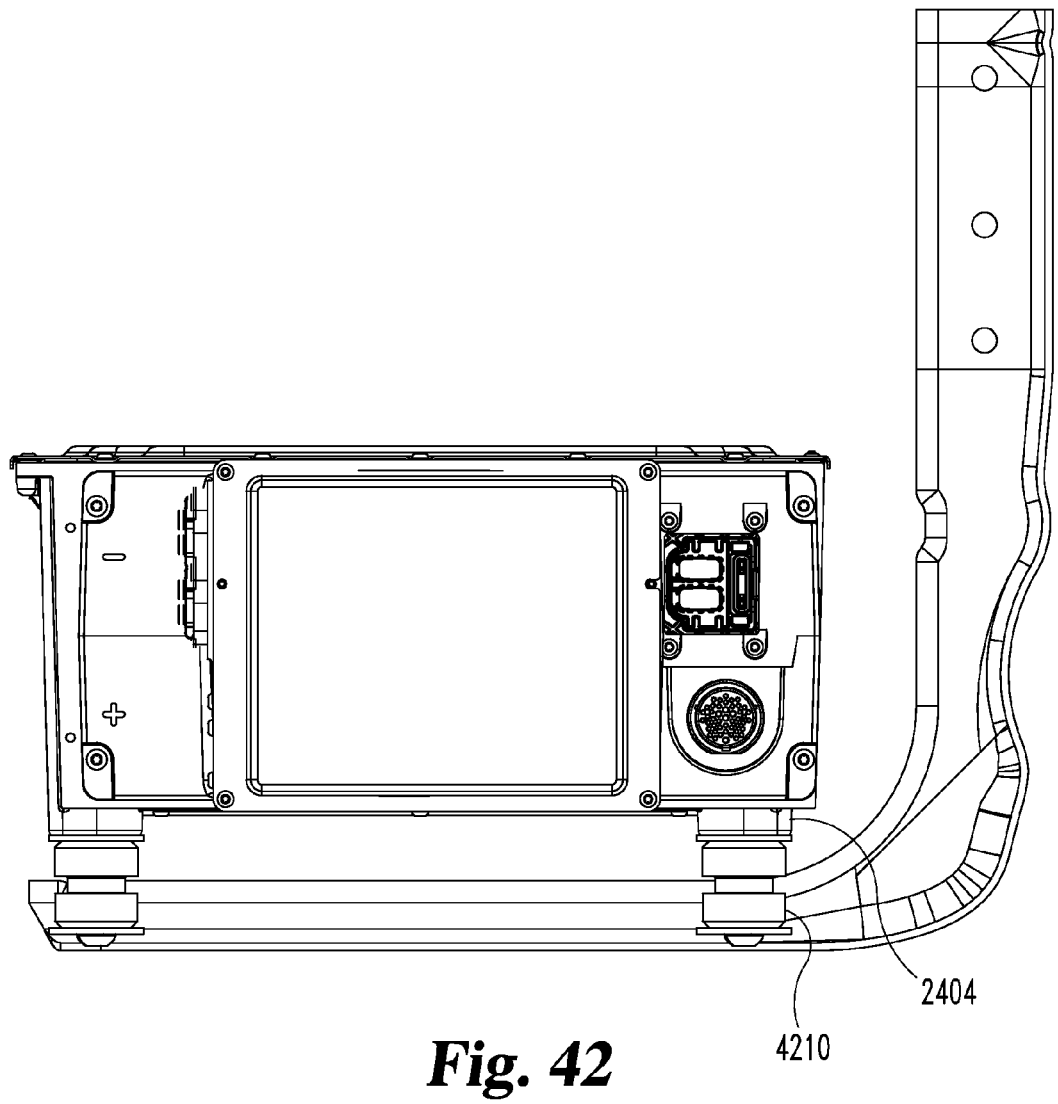
FIG. 42 is a front view of the energy storage module of FIG. 24 mounted to a vehicular frame.
Figure 43:
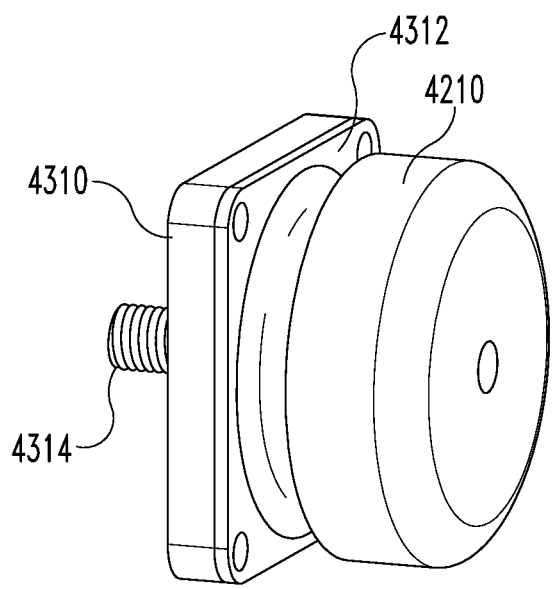
FIG. 43 is a perspective view of an isolator adapter for supporting an energy storage module according to one embodiment.

FIG. 42 depicts a frame mounting concept according to another embodiment of the disclosure. As shown, the enclosure 2404 of energy storage module 2402 is mounted to vehicular frame 4208 using isolator mounts 4210. The isolator mounts are constructed of a compliant material, such as rubber or silicone, and reduce the vibration transferred from vehicular frame 4208 to the energy storage module 2402. One example of a suitable isolator mount is the Barry Controls 200 series Cup Mount Isolator. An adapter bracket 4310 may be provided as shown in FIG. 43 to evenly distribute the weight of the energy storage module 2402 across the support surface 4312 of the isolator mount 4210 and allow connection to the energy storage module 2402 using a single fastener 4314.

Figure 44:
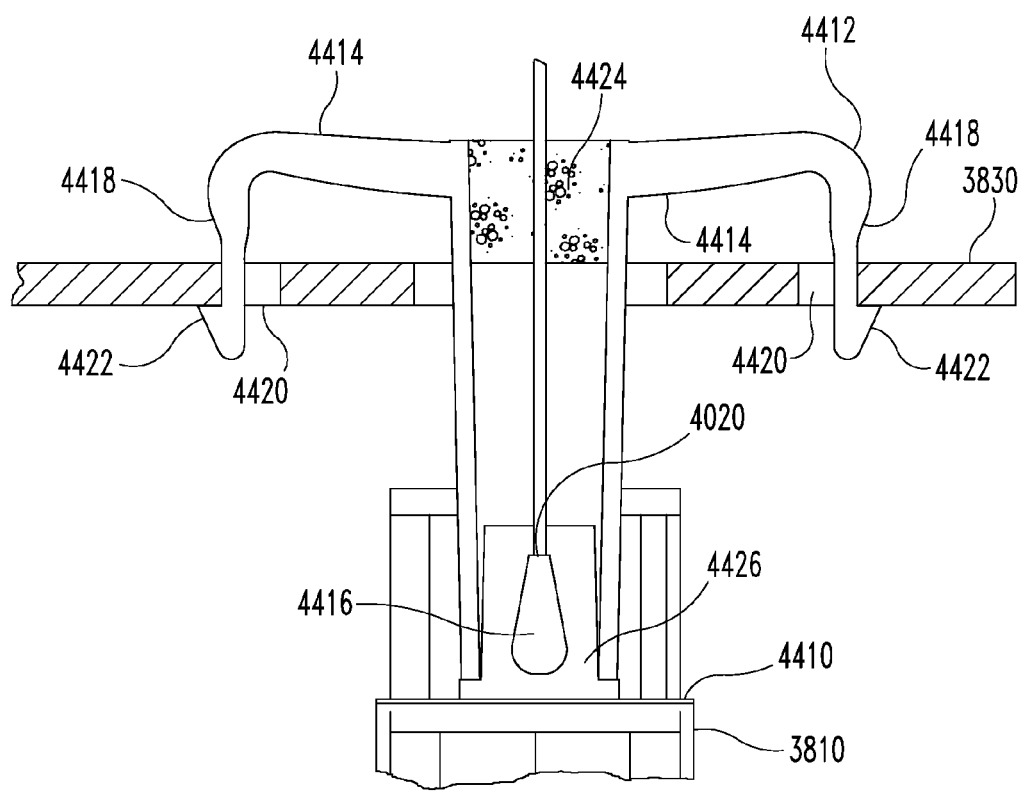
FIG. 44 is a front view of a thermistor mounting arrangement according to one embodiment of the present disclosure.
Figure 45:
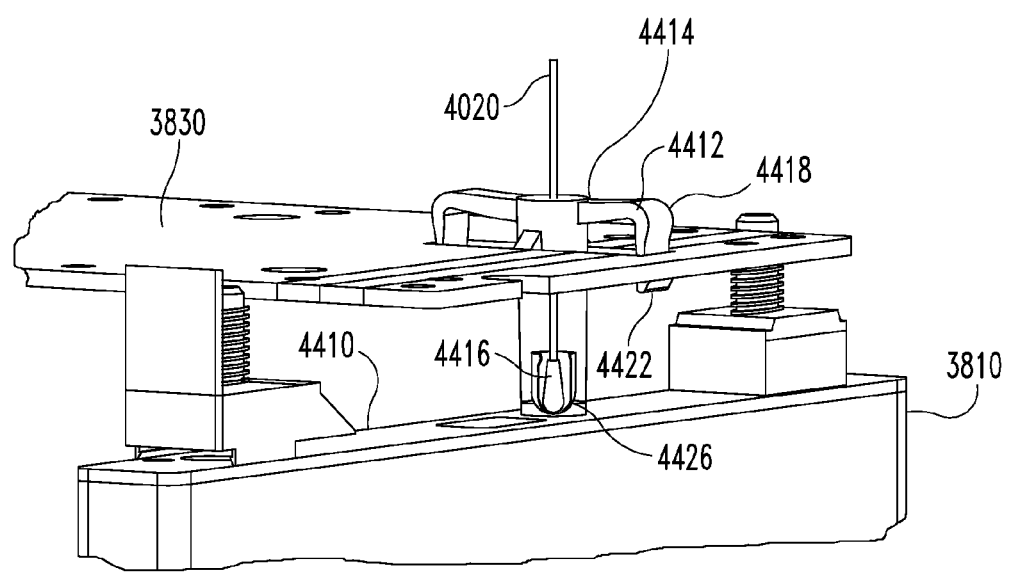
FIG. 45 is a perspective view of the thermistor mounting arrangement of FIG. 44.

FIGS. 44 and 45 illustrate a detailed view of a mounting arrangement for the thermistor 4020 according to one embodiment. The thermistor 4020 needs to maintain mechanical contact with the battery cell 3810 to provide accurate monitoring. However, the battery cells 3810 may vary in height due to manufacturing variations, resulting in a corresponding variation in the distance between the voltage sense board 3830 (in which the thermistor is mounted) and the top surface 4410 of the battery cell 3810. To account for this variation in distance, the thermistor 4020 may be installed within a flexible clip 4412 as shown. The flexible clip 4412 includes lateral portions 4414 which may flex vertically to hold the thermistor tip 4416 against the top surface 4410 of battery cell 3810. The clip 4412 further includes vertical portions 4418 which are secured in holes 4420 by tabs 4422. The thermistor 4020 may be secured to the clip 4412 using a potting material 4424 as shown. Other types of materials may also be used to fix the thermistor within the clip 4412, such as adhesives, cement, or the like. To provide further adjustability and tolerance, the thermistor tip 4416 may be encased in a compliant material 4426 which provides mechanical flexibility and thermal transfer, such as a thermoplastic elastomer (TPE). The compliant material 4426 and the clip 4412 work in combination to retain the tip of thermistor 4020 against the top surface 4410 of the battery cell 3810.

Figure 46A:
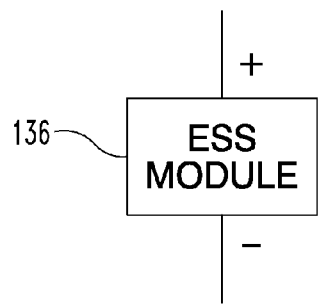
FIG. 46A is a diagram showing a single energy storage module for use in an energy storage system according to one embodiment.
Figure 46B:
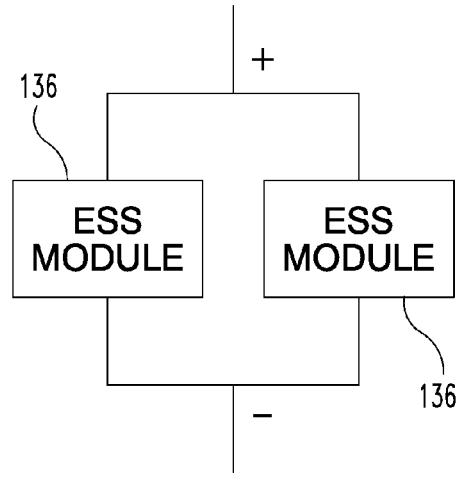
FIG. 46B is a diagram showing two energy storage modules connected in parallel according to one embodiment.
Figure 46C:
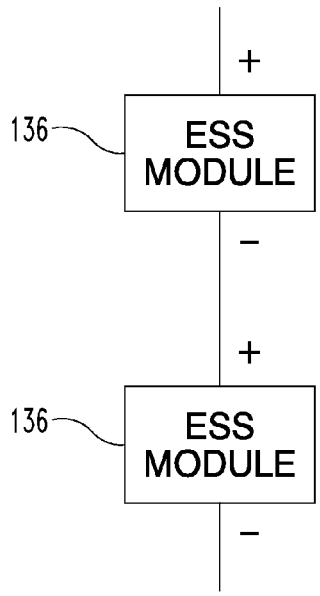
FIG. 46C is a diagram showing two energy storage modules connected in series according to one embodiment.
Figure 46D:
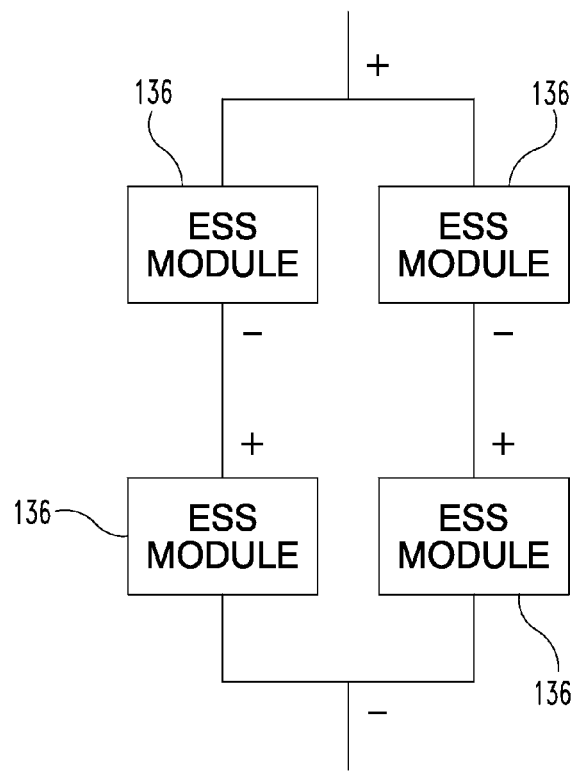
FIG. 46D is a diagram showing two pairs of energy storage modules connected in a series/parallel arrangement according to one embodiment.

As can be appreciated by those of skill in the art, a single energy storage module 136 may be used or a plurality of energy storage modules 136 can be connected to one another in a series, parallel, or series/parallel fashion. In one embodiment, multiple energy storage modules 136 may be connected in parallel to provide a 300V system, while two or more pairs of energy storage modules may be connected in series or series/parallel to provide a 600V system. Because the energy storage modules 136 can easily be incorporated into a 300V or 600V HEV application, the electronics are designed to meet the specifications of the higher voltage systems, such as creepage and clearance issues. Accordingly, arcing is of no concern when the energy storage module is used in a 600V setting. FIG. 46A shows an embodiment where a single energy storage module 136 is used. FIG. 46B shows an embodiment where two energy storage modules 136 are connected in parallel. FIG. 46C shows an embodiment where two energy storage modules are connected in series. FIG. 46D shows an embodiment where two pairs of energy storage modules 136 are connected in a series/parallel arrangement. It shall be understood that energy storage module 2402 may also be connected in various series, parallel, or series/parallel arrangements as discussed with respect to energy storage modules 136.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A heat sink for a vehicle energy storage module, comprising:
   a plurality of fins disposed angularly outward with respect to a longitudinal axis of the heat sink on an exterior surface of the energy storage module, the plurality of fins including a first portion, and a second portion, the second portion of the plurality of fins having inward-facing ends disposed inward with respect to the longitudinal axis of the heat sink; and
   a central cavity having a floor defined by the first portion of the plurality of fins and sides defined by the inward-facing ends of the second portion of the plurality of fins, the central cavity directing a flow of air from a first end of the heat sink toward a second end of the heat sink;
   wherein the plurality of fins are configured to conduct heat from within the energy storage module through the plurality of fins on the exterior surface; and
   wherein the central cavity narrows in width in the direction of the flow of air.

2. The heat sink of claim 1, wherein the height of the plurality of fins generally increases in the direction of the flow of air.

3. The heat sink of claim 1, wherein the plurality of fins are arranged in a substantially symmetrical pattern with respect to the longitudinal axis of the heat sink.

4. The heat sink of claim 1, wherein the central cavity defined by inward-facing ends is substantially centered with respect to the longitudinal axis of the heat sink, the first portion of the plurality of fins generally decreasing in length and the second portion of the plurality of fins generally increasing in length in the direction of the flow of air.

5. The heat sink of claim 1, wherein the first portion of the plurality of fins has a first height defining a floor of the central cavity and the second portion of the plurality of fins has a second height defining walls of the central cavity, the second height being greater than the first height.

6. The heat sink of claim 5,
   wherein a length of the second portion of the plurality of fins generally increases with the direction of the flow of air up to a first longitudinal distance from the first end of the heat sink; and
   wherein the length of the first portion of the plurality of fins generally decreases with the direction of air flow beyond the first longitudinal distance.

7. A heat sink for a vehicle energy storage module, comprising:
   a plurality of fins disposed angularly outward with respect to a longitudinal axis of the heat sink, a first portion of the plurality of fins having a first height, and a second portion of the plurality of fins having a second height, wherein the first height is lower than the second height; and
   a central cavity defined by the first height and the second height of the plurality of fins, the central cavity directing a flow of air from a first end of the heat sink toward a second end.

8. The heat sink of claim 7, wherein the plurality of fins are disposed on a first side of the heat sink, the heat sink configured to conduct heat from a heat source disposed on a second side of the heat sink through the plurality of fins on the first side of the heat sink.

9. The heat sink of claim 8, wherein the heat source is enclosed within the energy storage module.

10. The heat sink of claim 7, wherein the plurality of fins is integral to an exterior surface of the energy storage module.

11. The heat sink of claim 7,
    wherein a length of the second portion of the plurality of fins generally increases with the direction of the flow of air up to a first longitudinal distance from the first end of the heat sink; and
    wherein the length of the first portion of the plurality of fins generally decreases with the direction of air flow beyond the first longitudinal distance.

12. The heat sink of claim 7, wherein the first portion of the plurality of fins defines a floor of the central cavity and the second portion of the plurality of fins defines walls of the central cavity.

13. The heat sink of claim 7, wherein the central cavity defined by the plurality of fins is substantially centered with respect to the longitudinal axis of the heat sink.

14. A heat sink for a vehicle energy storage module, comprising:
- a plurality of fins arranged in a substantially symmetrical pattern with respect to the longitudinal dimension of the heat sink, the plurality of fins including a first portion having a first height, the plurality of fins also including a second portion having a second height, wherein the first height is lower than the second height, and the plurality of fins is disposed angularly outward away from the longitudinal axis of the heat sink; and
- a central cavity defined by the first portion and the second portion of the plurality of fins, the central cavity directing a flow of air from a first end of the heat sink toward a second end;
- wherein the central cavity narrows in the direction of the flow of air; and
- wherein the heat sink is disposed on an outside surface of the energy storage module.

15. The heat sink of claim 14, wherein the plurality of fins is integral to an exterior surface of the energy storage module.

16. The heat sink of claim 14, wherein the central cavity narrows in width in the direction of the flow of air.

17. The heat sink of claim 14, wherein the length of the plurality of fins generally increases in the direction of the flow of air.

18. The heat sink of claim 14,
- wherein a length of the second portion of the plurality of fins generally increases with the direction of the flow of air up to a first longitudinal distance from the first end of the heat sink; and
- wherein the length of the first portion of the plurality of fins generally decreases with the direction of air flow beyond the first longitudinal distance.

19. The heat sink of claim 14, wherein the first portion of the plurality of fins defines a floor of the central cavity and the second portion of the plurality of fins defines walls of the central cavity.

20. The heat sink of claim 14, wherein the central cavity defined by the plurality of fins is substantially centered with respect to the longitudinal axis of the heat sink.

* * * * *